(12) United States Patent
Caillerie et al.

(10) Patent No.: US 8,908,616 B2
(45) Date of Patent: Dec. 9, 2014

(54) METHODS AND DEVICES FOR TRANSMITTING AND RECEIVING DATA SIGNALS IN A WIRELESS NETWORK OVER A PLURALITY OF TRANSMISSION PATHS

(75) Inventors: Alain Caillerie, Rennes (FR); Lionel Tocze, Saint Domineuc (FR); Yacine El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 534 days.

(21) Appl. No.: 12/837,267

(22) Filed: Jul. 15, 2010

(65) Prior Publication Data

US 2012/0014367 A1 Jan. 19, 2012

(51) Int. Cl.
*H04W 4/00* (2009.01)
*H04B 7/00* (2006.01)
*H04B 7/08* (2006.01)
*H04W 40/06* (2009.01)
*H04B 7/06* (2006.01)

(52) U.S. Cl.
CPC .............. *H04B 7/088* (2013.01); *H04W 40/06* (2013.01); *H04B 7/0639* (2013.01)
USPC ............ 370/329; 370/336; 370/345; 455/509

(58) Field of Classification Search
None
See application file for complete search history.

(56) References Cited

U.S. PATENT DOCUMENTS

| 6,442,403 | B1 | 8/2002 | Becot et al. |
| 6,498,939 | B1 | 12/2002 | Thomas |
| 7,039,120 | B1 | 5/2006 | Thoumy et al. |
| 7,159,042 | B1 | 1/2007 | Morvan et al. |
| 2006/0136603 | A1 | 6/2006 | Morvan et al. |
| 2007/0072570 | A1* | 3/2007 | Hottinen et al. ........... 455/277.2 |
| 2008/0242251 | A1* | 10/2008 | Kraemer et al. ............. 455/272 |
| 2009/0156130 | A1* | 6/2009 | Wang et al. ..................... 455/68 |
| 2009/0290528 | A1* | 11/2009 | Kwon et al. ................... 370/315 |
| 2010/0054229 | A1 | 3/2010 | Thoumy et al. |
| 2011/0261684 | A1* | 10/2011 | Li et al. ......................... 370/225 |

FOREIGN PATENT DOCUMENTS

| EP | 1850503 A1 | 10/2007 |
| WO | 20041054135 A1 | 6/2004 |
| WO | 20081112849 A2 | 9/2008 |

OTHER PUBLICATIONS

U.S. Appl. No. 12/596,415, filed Apr. 5, 2010. Applicants: Lionel Tocze, et al.

\* cited by examiner

*Primary Examiner* — Marcus R Smith
(74) *Attorney, Agent, or Firm* — Canon USA, Inc. IP Division

(57) ABSTRACT

A method includes emitting a reference signal following K transmission paths during a first configuration time slot, identifying valid transmission paths among the set of K transmission paths by listening, according to each transmission path of the set, for a feedback reference signal from the second device during the second configuration time slot; and emitting data signals in each communication time slot of which the associated transmission path has been identified as valid.

14 Claims, 17 Drawing Sheets

METHODS AND DEVICES FOR TRANSMITTING AND RECEIVING DATA SIGNALS IN A WIRELESS NETWORK OVER A PLURALITY OF TRANSMISSION PATHS

BACKGROUND OF THE INVENTION

The present invention relates to the field of wireless communication. The present invention especially relates to a method of transmitting data signals, a method of receiving data signals, a first device for transmitting data signals and a second device for receiving data signals.

FIG. 1 depicts for illustrative purposes a wireless communication network 102 employing spatial diversity relying on the use of a plurality of transmission paths between communicating devices. More particularly, network 102 illustrates a 60 GHz (millimeter band) radio transmission system well suited to very high bit rate data transmission as for example video distribution.

Network 102 comprises a first device 110 that represents a data source node and a second device 120 that represents a data destination node. In this particular example, the second device 120 is composed of a communication device 190 connected to the wireless network and of a display device 180 connected to the communication device 190 for rendering the received data content, e.g. displaying the video. It is to be noted that the first device 110 may also represent a data relay node instead of being the originator of the data, the data source node being then represented by another device 100 belonging to the communication network. It is common to have a meshed network comprising relay nodes for relaying data between different devices to cope with the short range of the millimeter waves.

A transmitted signal from first device 110 may reach second device 120 through a line-of-sight (LOS) transmission path A if it is not blocked by any obstacle. In addition, the signal may be reflected by objects 115 which may cause a plurality of non line-of-sight (NLOS) transmission paths B, C and D.

It is known in the state of the art to use narrow beam steering antennas 111, 121 both at the first device 110 when emitting a signal and at the second device 120 when receiving the signal. Steering an antenna to a given orientation corresponds to configuring its parameters (for example the weighting coefficients associated with the elements of an antenna array) such that the radiation of the signal, in case of emission, or the antenna sensitivity, in case of reception, is accentuated in that given direction relatively to other directions. This has the advantage of providing high antenna gains and allowing the fulfillment of link budget requirements for high bit rate applications as video distribution.

In such a situation, both narrow beam antennas 111, 121 have to be steered to an orientation that corresponds to one given transmission path. This latter could be either a LOS transmission path or a NLOS transmission path as depicted in FIG. 1 for transmission paths A and B. Synchronization between the two devices is thus needed regarding which transmission path to use and appropriate configuration of their corresponding antennas is necessary to orientate the two beams in the right directions.

This problem becomes critical when very short time is available for finding and/or agreeing on the transmission path to use. Indeed, even if a full scan is performed in three dimensions for searching for all possible paths beforehand, these transmission paths may not be available or valid when the communication actually starts because of the moving obstacles that may interrupt the communication or because the objects 115 over which signals are reflected have been displaced. Communicating devices should then be able to adjust transmission paths used as a function of the network environment so that to always maintain acceptable communication quality.

In addition, there may be a need to change the transmission path used from one communication to another regardless of the knowledge on whether the initially used transmission path is still valid or not. This has the advantage of introducing spatial diversity and thus making the communication more robust against transmission errors or data loss that may result from noise or from obstacles in one of the transmission paths.

For example, one can use a technique of transmitting a video alternatively through different transmission paths in conjunction with concealment mechanisms. Video lines 1, 2, 3, 4, 5, . . . may be successively transmitted along available transmission paths A, B, C and D (line 1: A, line 2: B, line 3: C, line 4: D, line 5: A, etc.). Thus, if one path is disrupted, only 1 line over M (M equals to 4 in the above example) is lost, and the full video can be reconstructed based on the other correctly received lines using concealment mechanisms (duplication from the previous line, or pixels averaging from adjacent received pixels, . . . ).

Nevertheless, in order to use such technique, communicating devices should agree on the transmission path they have to use at each communication.

This is particularly true for a synchronous communication channel implementing a time division multiplexing (TDM) for sharing communication channel access between different communicating devices. In TDM, as depicted by FIG. 2, time domain is divided into a plurality of time slots 214, 221, 222, . . . , 224, 231. Each emitting device is allotted one time slot periodically in each cycle 210, 220, 230 for emitting its signal towards a receiving device using for example a given transmission path. A difficulty is then to be able to swiftly determine and associate a reliable transmission path with each time slot.

Moreover, using an antenna beam that is steerable in three dimensions (3D) advantageously increases the chances of finding many transmission paths (all objects including walls, ceiling and floor can then be acting as reflecting objects 115), but at the same time renders the implementation of searching for/updating of the set of all possible transmission paths more difficult because of the required time for doing the search.

The invention in at least one of its embodiments is aimed at overcoming these different drawbacks of the prior art.

More specifically, an objective of at least one embodiment of the invention is to provide a technique for determining transmission paths for a first and a second device for communicating via narrow beam antennas (referred to as point-to-point communication mode) when using a synchronous wireless communication channel implementing a time division multiplexing (TDM) scheme.

It is another goal of at least one embodiment of the invention to provide a technique of this kind that makes it possible to configure the orientations of the antennas beams at the emitting (first) and receiving (second) devices corresponding to transmission paths parameters.

BRIEF SUMMARY OF THE INVENTION

According to a first aspect of the present invention, there is provided a method of transmitting data signals from a first device (110) to a second device (120) during a cycle of a synchronous wireless communication channel implementing a time division multiplexing (TDM) scheme, wherein the cycle comprises:

a first and a second configuration time slots allotted respectively to the first and to the second devices for emitting reference signals and M (M≥1) communication time slots, each of them allotted to the first device to emit data signals to the second device following one transmission path, associated with said communication time slot, among a set of K transmission paths between the first and the second devices. The method in its first aspect being performed by first device during said cycle and comprising the steps of:

emitting a reference signal following, at least, the K transmission paths during the first configuration time slot;

identifying valid transmission paths among the set of K transmission paths by listening, according to each transmission path of the set, for a feedback reference signal from the second device during the second configuration time slot; and emitting data signals in each communication time slot of which the associated transmission path has been identified as valid.

Correlatively, the present invention relates to a first device for transmitting data signals to a second device during a cycle of a synchronous wireless communication channel implementing a time division multiplexing (TDM) scheme, wherein the cycle comprises:

a first and a second configuration time slots allotted respectively to the first and to the second devices for emitting reference signals and M (M≥1) communication time slots, each of them allotted to the first device to emit data signals to the second device following one transmission path, associated with said communication time slot, among a set of K transmission paths between the first and the second devices. The first device comprising:

means for emitting a reference signal following, at least, the K transmission paths during the first configuration time slot;

means for identifying valid transmission paths among the set of K transmission paths by listening, according to each transmission path of the set, for a feedback reference signal from the second device during the second configuration time slot; and means for emitting data signals in each communication time slot of which the associated transmission path has been identified as valid.

According to a second aspect of the present invention, there is provided a method of receiving data signals by a second device (120) from a first device (110) during a cycle of a synchronous wireless communication channel implementing a time division multiplexing (TDM) scheme, wherein the cycle comprises:

a first and a second configuration time slots allotted respectively to the first and to the second devices for emitting reference signals and M (M≥1) communication time slots, each of them allotted to the first device to emit data signals to the second device following one transmission path, associated with said communication time slot, among a set of K transmission paths between the first and the second devices. The method in its second aspect being performed by second device during said cycle and comprising the steps of:

identifying valid transmission paths at least among the set of K transmission paths by listening, according to each transmission path of the set, for a reference signal from the first device during the first configuration time slot;

emitting, during the second configuration time slot, a feedback reference signal following each transmission path of a selection list containing all or part of the identified valid transmission paths; and receiving data signals from each communication time slot of which associated transmission path belongs to the selection list.

Correlatively, the present invention relates to a second device for receiving data signals from a first device during a cycle of a synchronous wireless communication channel implementing a time division multiplexing (TDM) scheme, wherein the cycle comprises:

a first and a second configuration time slots allotted respectively to the first and to the second devices for emitting reference signals and M (M≥1) communication time slots, each of them allotted to the first device to emit data signals to the second device following one transmission path, associated with said communication time slot, among a set of K transmission paths between the first and the second devices. The second device comprising:

means for identifying valid transmission paths at least among the set of K transmission paths by listening, according to each transmission path of the set, for a reference signal from the first device during the first configuration time slot;

means for emitting, during the second configuration time slot, a feedback reference signal following each transmission path of a selection list containing all or part of the identified valid transmission paths; and means for receiving data signals from each communication time slot of which associated transmission path belongs to the selection list.

There is thus proposed a novel and inventive approach to the dynamic selection of transmission paths. Identifying valid transmission paths among a predetermined set of K transmission paths allows, in a short time at the start of a cycle, for the first device and the second device to agree on a selection list of valid transmission paths to be used for communicating during the communication time slots of the current cycle. Indeed, scanning all possible directions, which represents a time consuming task, is performed either at system initialization (for examples when devices that intend to communicate join the network before an actual data transmission starts) or regularly as a background task when there is time available.

Advantageously, the second configuration time slot contains M sub-slots uniquely associated with the M communication slots, and wherein the step of identifying valid transmission paths by first device comprising the steps of:

during each sub-slot, listening for the feedback reference signal according to, successively, all the K transmission paths; and for each sub-slot during which the feedback reference signal has been detected, identifying the transmission path according to which the reference signal has been detected as valid and associating said transmission path to the communication time slot associated with said sub-slot.

At the second device side, the emitting of the reference feedback is performed in M sub-slots following respectively the M transmission paths of the selection list.

This allows the first device to know which transmission path to use in each communication time slot when emitting data signals. This provides a great flexibility for the second device to select the appropriate transmission paths to be used at each cycle with the possibility of modifying them from one cycle to another, either because some transmission paths are no longer valid and/or for increasing spatial diversity. This has also the advantage of quickly checking the validity of transmission paths in each cycle before data signals emission.

Thus, the second device takes profit of each configuring sub-slot for trying different transmission paths corresponding to predetermined receiving antenna configurations (i.e. orientation angle sets) and identifying valid transmission paths. In a particular embodiment, the second device selects, among the identified receiving antenna configurations, the one for which the level of reception quality is the highest. Therefore it is possible to maintain high quality communications of data between the transmitter and the receiver during the communication time slots.

Advantageously, if the number of identified valid transmission paths is greater than the number of communication slots (M), the selection list is built by selecting M distinct valid transmission paths. Otherwise, the selection list is built by selecting all the identified valid transmission paths and re-selecting as much as possible of distinct valid transmission paths so that to form a selection list of M transmission paths. This allows to ensure a spatial diversity.

Particularly, the emitting a data signal in said each communication time slot by first device is performed following the transmission path associated with said communication time slot during the associated sub-slot of the second configuration time slot.

In a preferred embodiment of the invention, the emitting of the reference signal by the first device is performed in all possible directions by using a wide beam or omnidirectional sender antenna. This has the advantage of allowing the possible discovery of new transmission path by the second device if it performs a search in other directions than those corresponding to the already identified K transmission paths According to a particular mode of the invention, if during at least one sub-slot no feedback reference signal has been detected, the first device performs the following steps during the communication time slot associated with said sub-slot:
  switching from emission mode to reception mode; and
  searching for a valid transmission path by listening for a feedback reference signal from the second device according to all possible directions, wherein a valid transmission path is found when the feedback reference signal is detected;
the first device then updates the set of K transmission paths with the found transmission path.

This particular mode of the invention proposes to take profit of one or several additional time slots for performing a full scan of the 3D space in order to discover new transmission paths to use. Thus, the transmitter and the receiver have more time to determine all the possible aligned and non-aligned (reflected paths) transmission paths and to select the best one.

Advantageously, searching step is performed by the first device by scanning in three dimensions using a narrow beam receiving antenna to detect the feedback reference signal.

According to another particular mode of the invention, the step of identifying valid transmission paths by the second device consists of listening for the reference signal according to, successively, all the set of K transmission paths; the reference signal being emitted by the first device in all possible directions by using a wide beam or omnidirectional sender antenna.

Advantageously, the step of identifying valid transmission paths by second device further comprising the steps of:
  searching for a valid transmission path by listening for a signal from the first device according to all possible directions, wherein a valid transmission path is found when a signal is detected; and
  updating the set of K transmission paths with the found transmission path.

This allows the discovery by the second device of new transmission paths and thus the update of the set of the transmission paths.

According to a particular mode of the invention, if the set of transmission paths is updated with a newly found transmission path and if said new path is included in the selection list as built by the second device, the second device performs the following steps during the communication time slot associated with said new path:
  switching from reception mode to emission mode; and
  emitting a feedback reference signal following the new transmission path.
Particularly, the steps of searching and updating are executed during at least one of the following:
  the first configuration time slot of any cycle after the listening for the reference signal according to all the set of K transmission paths is finished;
  any time slot allotted for the first device to emit a signal when the set of K transmission paths is empty.

This has the advantage to take profit of one or several additional time slots for performing a full scan of the 3D space in order to give time to the first device to discover new transmission paths to use. It has also the advantage when no transmission path is identified, and as no communication can be performed in point-to-point mode, to dedicate the available for searching new transmission paths.

DETAILED DESCRIPTION OF THE INVENTION

Figure 1:
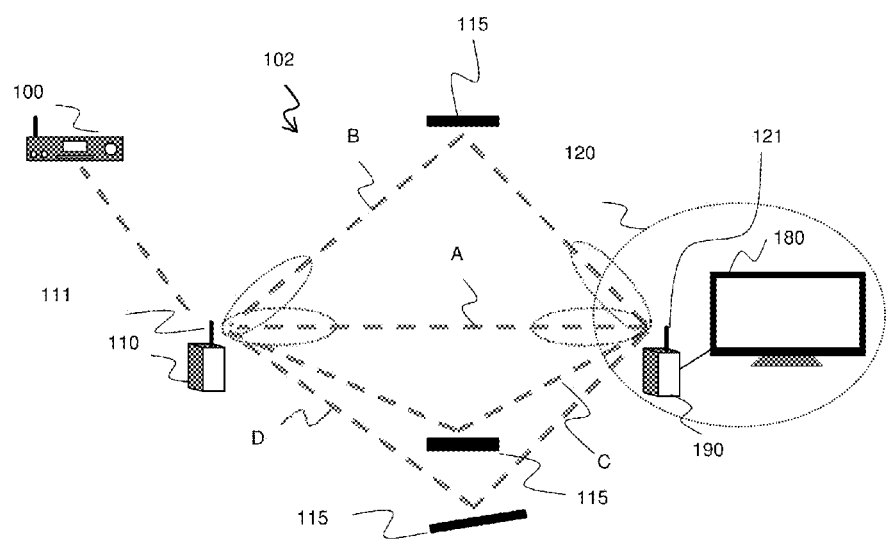
FIG. 1 depicts for illustrative purposes a wireless communication network employing spatial diversity.
Figure 2:
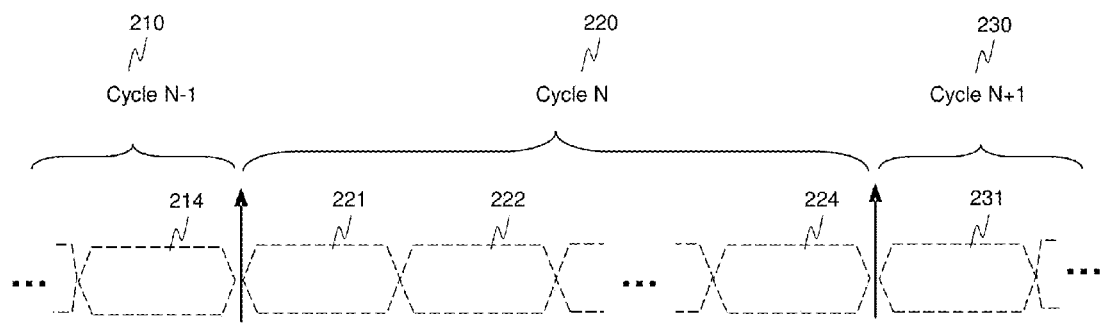
FIG. 2 depicts a conventional time division multiplexing (TDM) scheme.

The invention is described, in at least one of its embodiments, by considering the example of the wireless network of FIG. 1. In this wireless network, first device 110 represents the data source node and second device 120 represents the data destination node. The invention is of course not limited to this particular example and may apply to any number of pairs of communicating devices. The invention is also applicable if the first device 110 is acting as a data relay node.

Figure 3:
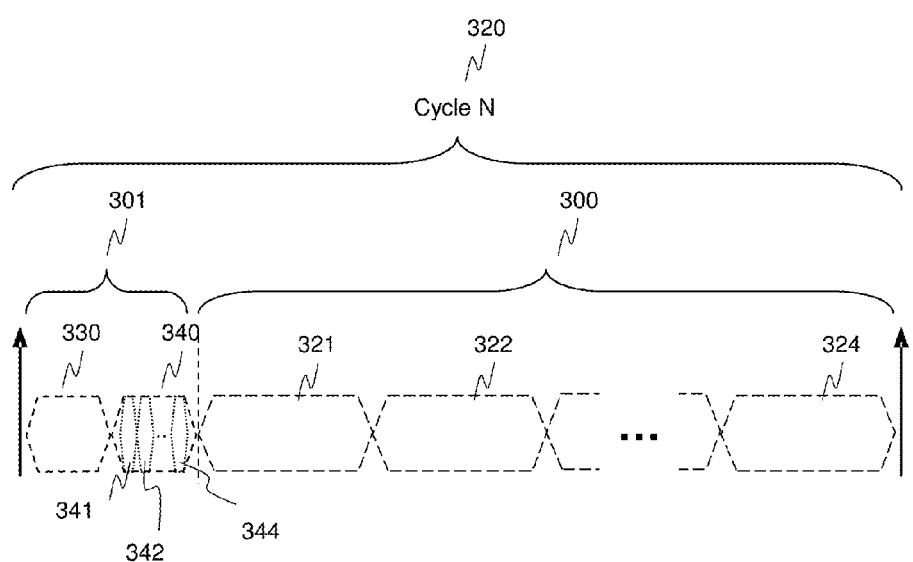
FIG. 3 illustrates a TDM scheme that is used for implementing an embodiment of the invention.

FIG. 3 illustrates a TDM scheme that is used for implementing an embodiment of the invention.

Time domain is divided into a plurality of successive network cycles 320 (N, N+1, . . . ) (they can also be referred to as frames). The start of a cycle is signaled to all devices of the network by a beacon signal emitted by a central device (master) that can be a distinct device or one of the communication devices 100, 110 or 120. Each communication cycle 320 is further divided into a configuration period 301 and a communication period 300 during which application data is transmitted from a data source or relay node to a data destination node.

Thus, two transmission modes are to be distinguished. The first mode, referred to as configuration mode, may use low bit rate data transmission (as compared with the capacity of the communications network). During this first mode, emission and reception antennas can be configured either as narrow beam antennas or as wide/omnidirectional beam antennas to cover simultaneously a plurality of transmission paths. The second mode, referred to as communication mode or point-to-point mode, corresponds to high bit rate data transmission. During this second mode, both emission and reception antennas are configured as narrow beam antennas to achieve better signal-to-noise ratio (SNR).

The communication period 300 comprises a plurality of communication time slots 321-324. In the context of the example of FIG. 1 where data is to be transmitted from first device 110 to second device 120, M communication time slots during the communication period 300 are allotted to the first device 110 for emitting its signal using a narrow beam antenna towards the second device 120. A different path is possibly used during each one of these M time slots as it will be detailed later on. Second device 120 has to orientate its reception antenna beam appropriately at each time slot to receive the signal emitted by first device 110.

The configuration period 301 comprises two configuration time slots; a first configuration time slot 330 and a second configuration time slot 340 allotted respectively to first device 110 and to second device 120. These configuration time slots are used to configure narrow beams antennas that are to be used by the two devices during their communication in the communication period 300. The configuration period 301 may comprise further configuration time slots if additional devices in the network need to have their antennas configured for communication during the communication period 300.

The second configuration time slot 340 allotted to second device 120 is further divided into a plurality of M sub-slots 341, 342, . . . , 344 referred to as configuration sub-slots. In a particular embodiment of the invention, the first configuration time slot 330 allotted to first device 110 is also divided into a plurality of K configuration sub-slots (not represented on the figure) where K represents a number of transmission paths known by first device 110.

Each transmission path between an emitting device and a receiving device is defined by a pair of a first orientation at the emitting device and of a second orientation at the receiving device. The emission of a signal following a given path consists of sending the signal in at least the first orientation associated with said given path, either by using a narrow beam emitting antenna steered in that first orientation or a wide or omnidirectional antenna that covers said first orientation. A narrow beam antenna is preferably used when emitting a data signal and a wide or omnidirectional antenna is preferably used when emitting reference signals because the requirements in terms of signal-to-noise ratio (SNR) are higher for a data signal than that of a reference signal (which does not embed data and thus is less sensitive to errors). Listening for a signal or receiving a signal according to a given transmission path consists of detecting said signal when the receiving antenna is configured in narrow beam steered in the second orientation associated with said given path.

Figure 4:
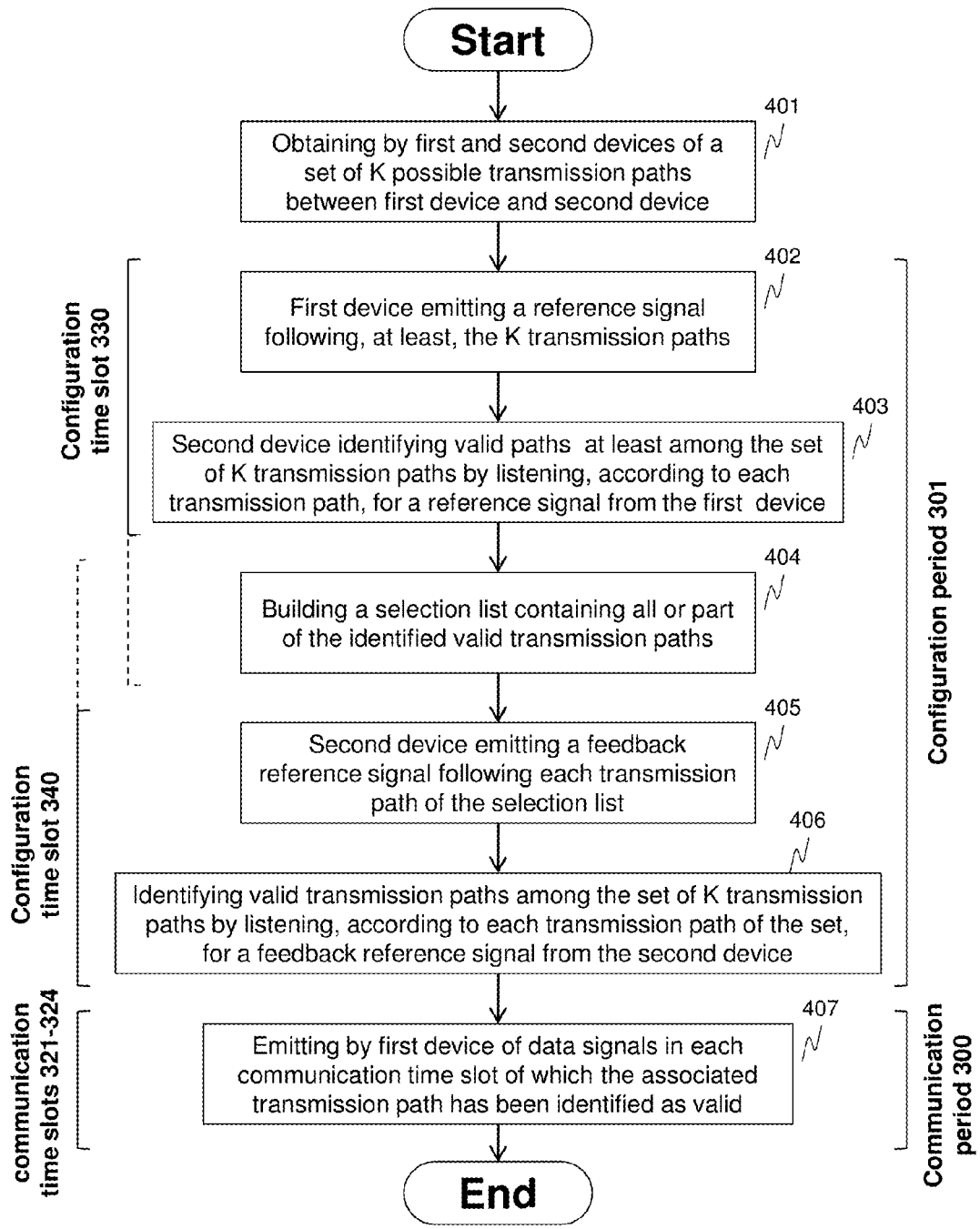
FIG. 4 depicts a flowchart for transmitting and receiving data signals according to one embodiment of the invention.

FIG. 4 depicts a flowchart for transmitting and receiving data signals according to one embodiment of the invention.

At step 401, a set of possible transmission paths between first device 110 and second device 120 is obtained by both first and second devices. It is assumed that this set contains K possible transmission paths (cardinal of the set being then K).

Figure 7A:
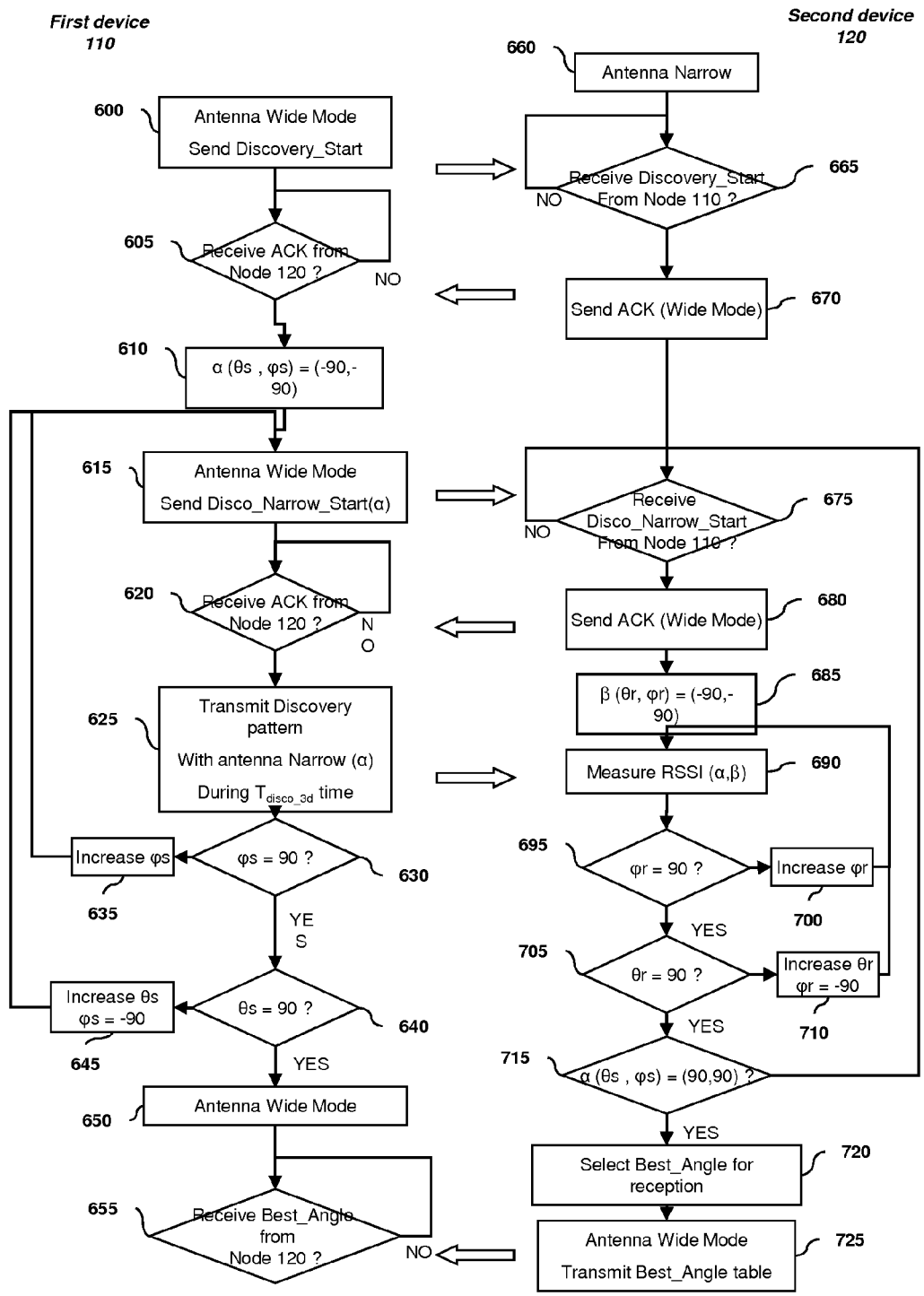
FIG. 7a illustrates an initialization procedure enabling first device 110 and second device 120 to exchange best path configuration.
Figure 7B:
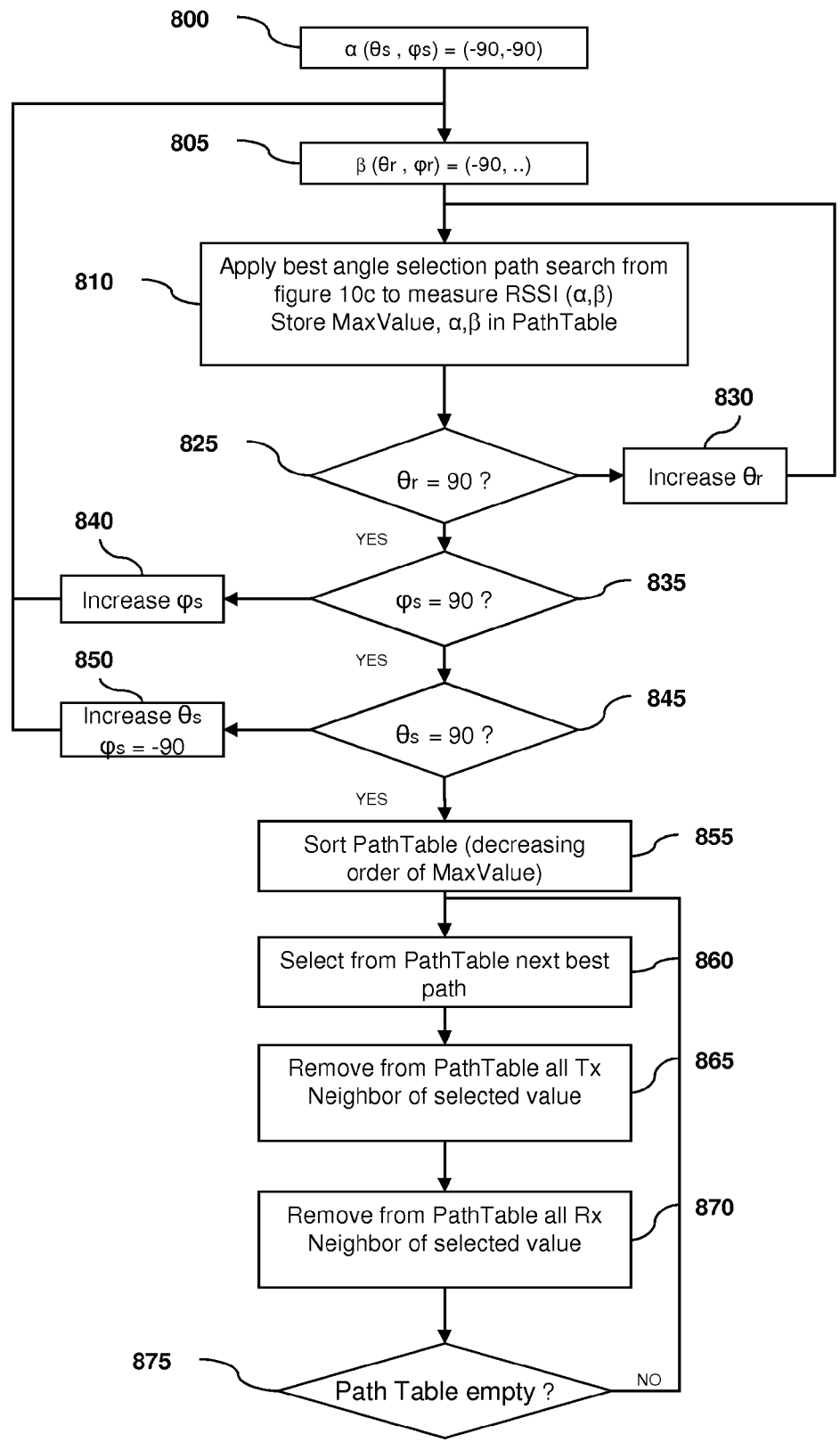
FIG. 7b illustrates a selection algorithm executed by a receiver node according to a particular embodiment of the invention.
Figure 7C:
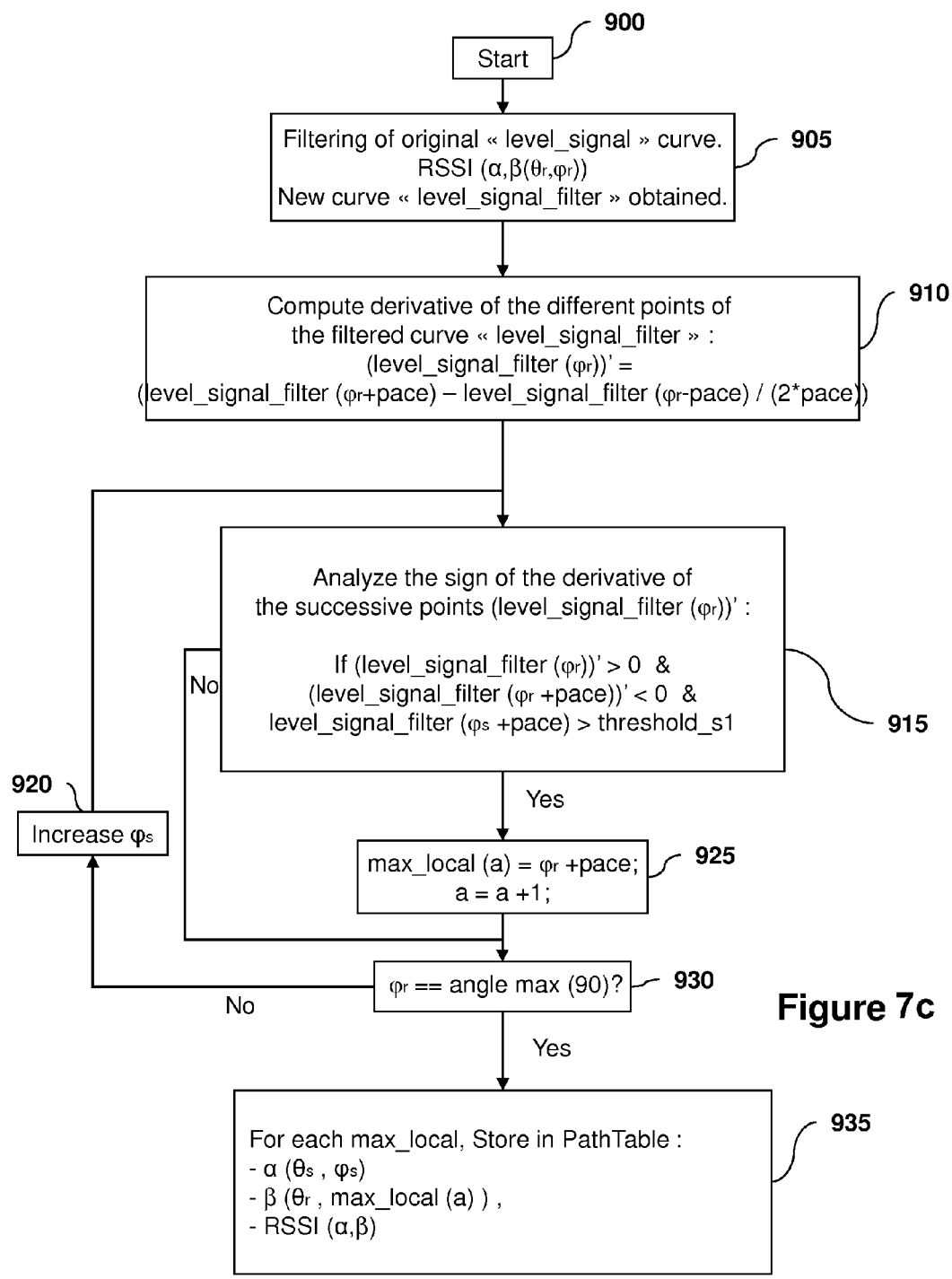
FIG. 7c illustrates a research algorithm executed by a receiver node according to a particular embodiment of the invention.

This step can be executed at some point in time, like system startup or the joining of the first and second devices to network, when the set is empty in order to populate it 5 by new discovered transmission paths (cf. flowcharts of FIGS. 7a, 7b and 7c showing an initialization example of the set by performing an exhaustive search for the possible transmission paths).

This step can also be executed on a more regular basis in order to update the content of the set with new transmission paths. Advantageously, when the set is updated with new transmission paths identified by the second device, these new transmission paths are propagated seamlessly to the first device for updating its own set as it will be described hereinafter.

At step 402, the first device emits a reference signal following, at least, the K transmission paths during the first configuration time slot 330.

Preferably, the step 402 of emitting the reference signal is performed in all possible directions by using a wide beam or omnidirectional sender antenna. This has the advantage of allowing the possible discovery of new transmission path by the second device if it performs a search in other directions than those corresponding to the already identified K transmission paths (cf. details in step 403).

Alternatively, the first device emits the reference signal successively following the K transmission paths by using a narrow beam antenna. This has the advantage of providing a better SNR for the reference signal. For implementing this alternative, K sub-slots need to be defined at predefined positions within the first configuration time slot 330 (not represented in FIG. 3) known for the second device. Furthermore, the emission of the reference signal following the different transmission paths should be done according to a predetermined sequence also known to the second device. This allows the second device when executing the identifying step 403 to listen for a reference signal according to the same predetermined sequence of transmission paths and during the predefined sub-slots in the first configuration time slot 330.

The reference signal does not necessarily embed useful information, it may just consist for example of a non-modulated carrier frequency. However its strength does matter for allowing the second device detecting the signal and identifying the direction of arrival parameter of the transmission path. Even when the reference signal is emitted by means of a wide or omnidirectional antenna, i.e. a lower antenna gain than that of a narrow beam antenna, the signal to noise ratio may be enough to distinguish the signal from noise. This makes the signaling about transmission paths parameters (corresponding orientations at the emitting device and at the receiving device) between the emitting and the receiving devices more robust compared to when such parameters are embedded in the signal and thus needs to be decoded without errors.

At step 403, the second device identifies valid transmission paths at least among the set of K transmission paths by listening, according to each transmission path of the set, for a reference signal from the first device during the first configuration time slot 330.

In a preferred embodiment, the step 403 of identifying valid transmission paths consists of listening for the reference signal according to, successively, all the set of K transmission paths when the reference signal is emitted by the first device in all possible directions by using a wide beam or omnidirectional sender antenna as indicated above.

The identifying of valid transmission paths should not be limited to the set of K transmission path if time is available during the first configuration time slot 330 or during any other time slot when first device is emitting, particularly when the set of K transmission paths is empty. In this case, second device performs a search for valid transmission paths by listening for a signal from the first device according to all possible directions in the three dimensions, wherein a valid transmission path is found when a signal is detected. This allows the discovery by the second device of new transmission paths and thus the update of the set of the transmission paths.

At step 404, second device builds a selection list containing all or part of the identified valid transmission paths.

Advantageously, if the number of identified valid transmission paths is greater than the number of communication slots (M), the selection list is built by selecting M distinct valid transmission paths. Otherwise, the selection list is built by selecting all the identified valid transmission paths and re-selecting as much as possible of distinct valid transmission paths so that to form a selection list of M transmission paths.

At step 405, second device emits, during the second configuration time slot 340, a feedback reference signal following each transmission path of the selection list.

Advantageously, the emitting of the reference feedback is performed in the M sub-slots 341-344 following respectively the M transmission paths of the selection list.

At step 406, first device identifies valid transmission paths among the set of K transmission paths by listening, according to each transmission path of the set, for a feedback reference signal from the second device during the second configuration time slot 340.

Particularly, during each sub-slot 341-344, first device listens for the feedback reference signal according to, successively, all the K transmission paths. For each sub-slot during which the feedback reference signal has been detected, first device identifies the transmission path according to which the reference signal has been detected as valid, and associates said transmission path to the communication time slot associated with said sub-slot.

Identifying valid transmission paths among a predetermined set of transmission paths allows, in a short time at the start of a cycle, for the first device and the second device to agree on a selection list of valid transmission paths to be used for communicating during the communication time slots of the current cycle. Indeed, the scanning of all possible directions which represents a time consuming task, is performed either at system initialization (for examples when devices that intend to communicate join the network before an actual data transmission starts) or regularly as a background task when there is time available.

At step 407, first device emits a data signal in each communication time slot 321-324 for which the associated transmission path has been identified as valid. The emitting of a data signal in said each communication time slot is performed following the transmission path associated with said communication time slot during the associated sub-slot of the second configuration time slot 340.

Simultaneously, second device receives data signals from each of said communication time slots. The second device relies on its built selection list for identifying the above communication time slots as they correspond to the communication time slots associated with the transmission paths of the list.

In a preferred embodiment, if the set of transmission paths at the second device is updated with a newly found transmission path, this new transmission path can be selected for building the selection list (step 404). This selection can be performed for the purpose of increasing the spatial diversity with the new transmission path and/or to notify the new path to the first device to let it update its set of transmission paths.

When a new transmission path (the first device not yet aware of) has been included in the selection list by the second device, the second device performs the following steps during the communication time slot associated with said new path:
switching from reception mode to emission mode; and
emitting a feedback reference signal following the new transmission path.

From the first device side, no feedback reference signal will be detected in step 406 in the sub-slot associated with the new path because the first device listens for the feedback reference signal according to only know K transmission paths. This informs the first device that a new transmission path has to be discovered. In this case, instead of emitting a data signal during the communication time slot associated with the sub-slot (as no feedback signal is detected, there is no transmission path association with said transmission path) it switches to a receiving mode for performing a search for a transmission path. The first device listens then for a feedback reference signal from the second device according to all possible directions during the communication time slot. Advantageously, the search is performed by the first device by scanning in three dimensions using a narrow beam receiving antenna to detect the feedback reference signal. A valid transmission path is found when the feedback reference signal is detected. The first device then updates the set of K transmission paths with the found transmission path.

Figure 5A:
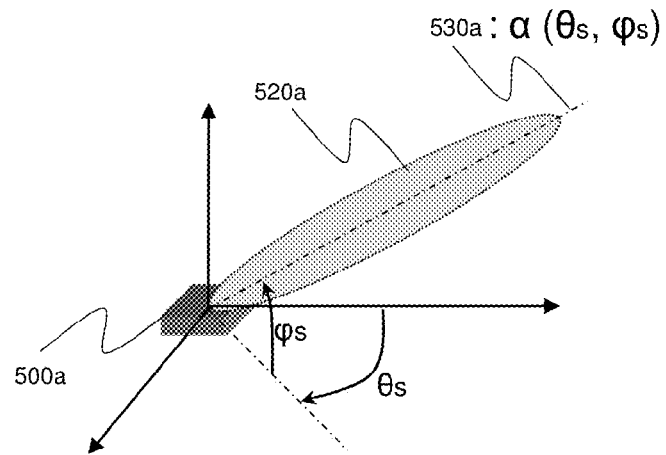
FIG. 5a illustrates a sender antenna configured directionally.
Figure 5B:
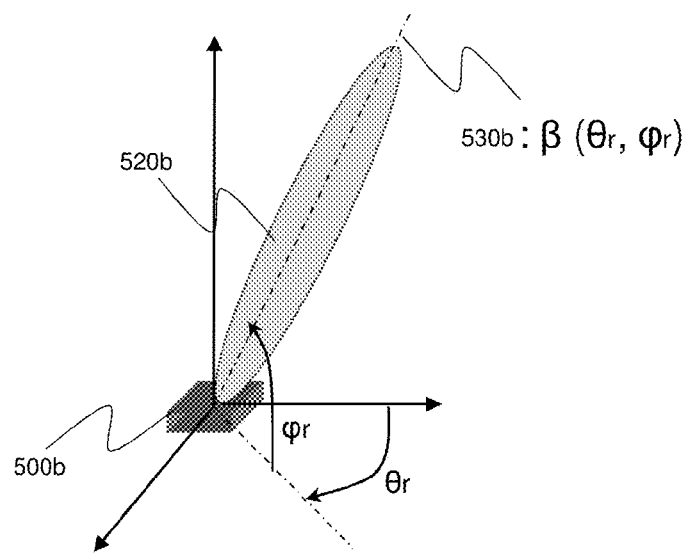
FIG. 5b illustrates a receiving antenna configured directionally.

FIG. 5a illustrates a sender antenna configured directionally (narrow antenna beam 520a) having a main direction 530a and FIG. 5b shows a receiving antenna configured directionally (or selectively, with narrow antenna beam 520b) having a main direction 530b.

As explained further below, each source node of the network implements a technique of antenna directivity known as beam forming. Indeed, an increase in the power of the signal in a desired direction can be obtained by reducing the width of the radiation angle in sending mode, thus making it possible either to increase the sending distance or, for equal distances, to increase the signal-to-noise (SNR) ratio for a targeted receiver node. Such a technique thus makes it possible to improve radio signal reception quality and reduce the error rates of the transmission channel.

The orientation α 530a of the narrow radiation beam 520a is defined by a couple of angles $\theta_s$ and $\phi_s$ (azimuth and elevation angles) and is noted herein $\alpha(\theta_s, \phi_s)$. This orientation is chosen from among a plurality of possible antenna orientations contained in the radiation zone of the antenna 500a configured omnidirectionally. In other words, the orientation $\alpha(\theta_s, \phi_s)$ can take any value where $\theta_s$ and $\phi_s$ are in the range from −90 degrees to 90 degrees.

The term "orientation" in the case of an agile (or smart) antenna corresponds to parameters for configuring the smart antenna matrix (weighting coefficients associated to the antenna array elements) such that the radiation when emitting or the sensitivity when receiving of the antenna is accentuated in this direction relatively to the other directions.

The orientation β 530b of the major lobe 520b of the receiver antenna 500b is defined by a couple of angles $\theta_r$ and $\phi_r$ (azimuth and elevation angles) and is noted herein $\beta(\theta_r, \phi_r)$. This orientation is chosen from among a plurality of possible antenna orientations belonging to the zone of sensitivity of the antenna 500b configured omnidirectionally. In other words, the orientation $\beta(\theta_r, \phi_r)$ can take any value where $\theta_r$ and $\phi_r$ are in the range from −90 degrees to 90 degrees.

Figure 6:
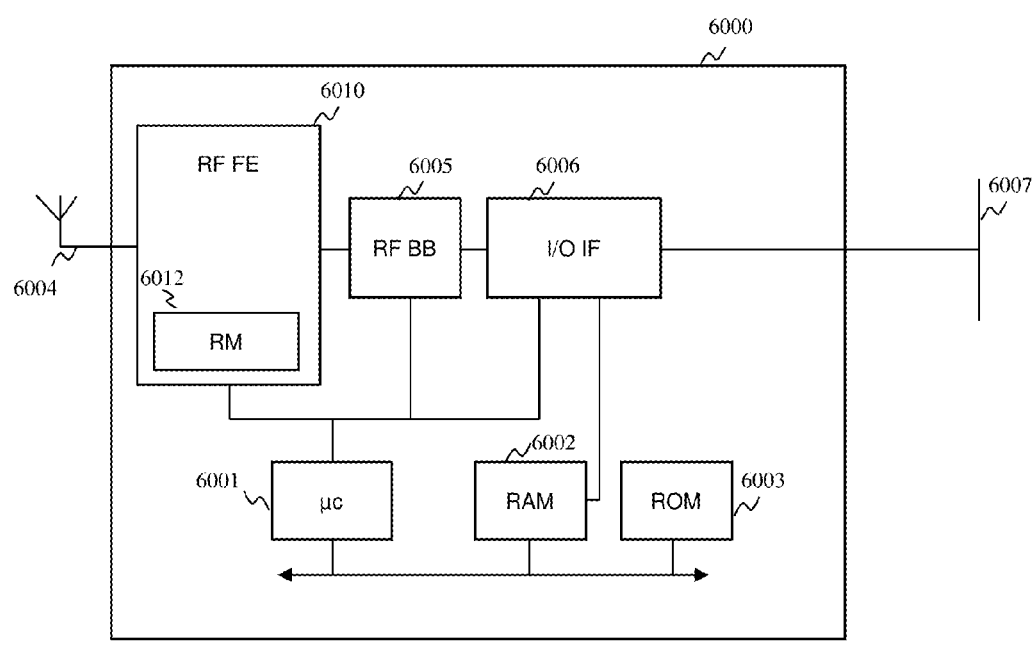
FIG. 6 shows the schematic structure of a communication device adapted to implement the invention in at least one of its embodiments.

FIG. 6 shows the schematic structure of a communication device 6000 of the communications network 102 implementing the method of receiving and/or the method of transmitting data signals according a particular embodiment of the invention.

More specifically, the communications device 6000 is integrated into each of the first device or the second device.

The communications device 6000 comprises:

a RAM (Random Access Memory) 6002 working as a main memory;

a computation block 6001 (denoted μc for "micro-controller") or CPU (Control Process 15 Unit) whose capacity can be extended by an optional random-access memory connected to an expansion port (not shown in FIG. 6). The CPU 6001 is capable of executing instructions from the ROM 6003. After the system has been powered on, the CPU 6001 is capable of executing instructions from the RAM 6002 pertaining to a computer program, once these instructions have been loaded from the ROM 6003 or an external memory (not shown in the present FIG. 6). A computer program of this kind, if executed by the CPU 6001, prompts the execution of a part or of the totality of the steps of the algorithms described herein with reference to FIGS. 4, 7a-c, 8a-c and 10 to 12;

a block 6010 (denoted RF-FE or front-end) responsible for matching the output signal of the baseband block 6005 (RF-BB or RF-baseband) before it is sent out by means of an antenna 6004. For example, the matching can be done by frequency transposition and power amplification processes. Conversely, the block 6005 also enables the matching of a signal received by the antenna 6004 before it is transmitted to the baseband block 6005. The baseband block 6005 is responsible for modulating and demodulating the digital data exchanged with the block 6010. The block 6010 has a sub-block 6012 (denoted as RM for Reception Measurement) constituted for example by an ADC (analog-digital converter) whose task is to measure the power of the signal received through the antenna 6004, the power measurement value being then communicated to the CPU 6001;

an input/output interface (I/O IF) block 6006 connected to a communications network 6007.

FIG. 7a illustrates an initialization procedure, enabling the first device 110 (also referred to as source node) and the second device 120 (also referred to as receiver node) to exchange best path configuration, used to implement multipath association adjustment for point-to-point mode, as described below in relation with FIGS. 8a, 8b and 8c. This initialization procedure is performed at start-up of the system.

At start-up, on a first step 600, the source node 110 sets its transmitting antenna configuration in the omnidirectional mode and transmits a "Discovery_Start" message. Then, it waits (step 605) for receiving from the receiver node 120 an "ACK" message, indicating that the receiver node 120 has correctly received the message and is ready for the next steps of the initialization procedure.

At start-up, on a step 660, the receiver node 120 sets its receiving antenna configuration in a narrow mode (i.e. directional antenna configuration) and waits for reception (step 665) of a "Discovery_Start" message sent from the source node 110.

Upon reception of the "Discovery_Start" message, the receiver node 120 sets its transmitting antenna configuration in an omnidirectional mode (or "Wide" mode), and transmits an "ACK" message to the source node 110 in order to proceed to the next step of the initialization procedure (step 670).

At step 610, the source node 110 sets its sender antenna orientation α (i.e. the orientation of the sender antenna set in the narrow mode) to the initial value α $(\theta_s=-90, \phi_s=-90)$.

Then, the source node 110 sets its transmitting antenna configuration in the omnidirectional mode and transmits a "Disco_Narrow_Start" message including settings value of its sender antenna orientation α (step 615). This "Disco_Narrow_Start" message indicates to the receiver node 120 to start measurement of the quality of reception according to a receiver antenna orientation β, corresponding to the settings of the sender antenna (of the source node 110) set in narrow mode at the orientation $\alpha(\theta_s, \phi_s)$. Then, the source node 110 waits (step 620) for receiving from the receiver node 120 an "ACK" message in wide mode (step 680). Upon reception of this "ACK" message, the source node 110 then proceeds to step 625, when it will transmit a discovery pattern with its sender antenna set in narrow mode at the orientation $\alpha(\theta_s, \phi_s)$. This transmission will be done during a time "Tdisco_3d", corresponding to a predetermined time enabling the receiver node 120, to parse all its receiver antenna orientation β and proceed to RSSI measurement and storage.

When time "Tdisco_3d" is elapsed, at step 630, a test is performed to verify if the discovery pattern has been sent according to a determined fixed $\theta_s$ value and all $\phi_s$ (from −90° to 90°) values. In other words, this test 630 verifies that $\phi_s$=90.

If the test 630 is negative, then the value of $\phi_s$ is increased (for example with a pace of +5° (step 635)), and a next discovery phase (615, 620, 625, 630) is performed according to a new sender antenna orientation α, where $\theta_s$ remains at the same value as the one used during the previous discovery phase and $\phi_s$ is the new value obtained after step 635.

On the other hand, if the test 630 is positive (i.e. the discovery pattern has been sent by the source node 110 according to a determined fixed $\theta_s$ value and all $\phi_s$ (from −90° to 90°) values), then a test is performed (step 640) to verify if the discovery pattern has been sent according to all $\theta_s$ values (from −90° to 90°). In other words, this test 630 verifies that $\theta_s=90°$.

If the test 640 is negative, then the value of $\theta_s$ is increased (for example with a pace of)+5° and $\phi_s$ is set to value −90° (step 645), and a next discovery phase (steps 615, 620, 625, 630, 635, 640) is performed according to a new sender antenna orientation α, where $\theta_s$ is the new value obtained after step 645 and $\phi_s$ will vary from −90° to 90° (steps 630, 635).

On the other hand, if the test 640 is positive (i.e. the discovery pattern has been sent by the source node 110 according to all θs value and all φs values, and the receiver node 120 has performed RSSI measurements for all the orientation α(θs, φs)), then the source node 110 sets its receiver antenna in wide mode (step 650) in order to receive a table, called hereafter "Best_Angle" table, from the receiver node 120. This "Best_Angle" table indicates to the source node 110 the best transmission paths to use during point-to-point mode. The "Best_Angle" table contains sets of α and β values that are selected by the receiver node 120 from RSSI measurements as explained hereafter in relation to FIGS. 7b and 7c. The "Best_Angle" table is representative of the set of transmission paths that is to be obtained by the source node (first device) and receiver node (second device).

At step 655, the source node 110 waits for this "Best_Angle" table.

Figure 8A:
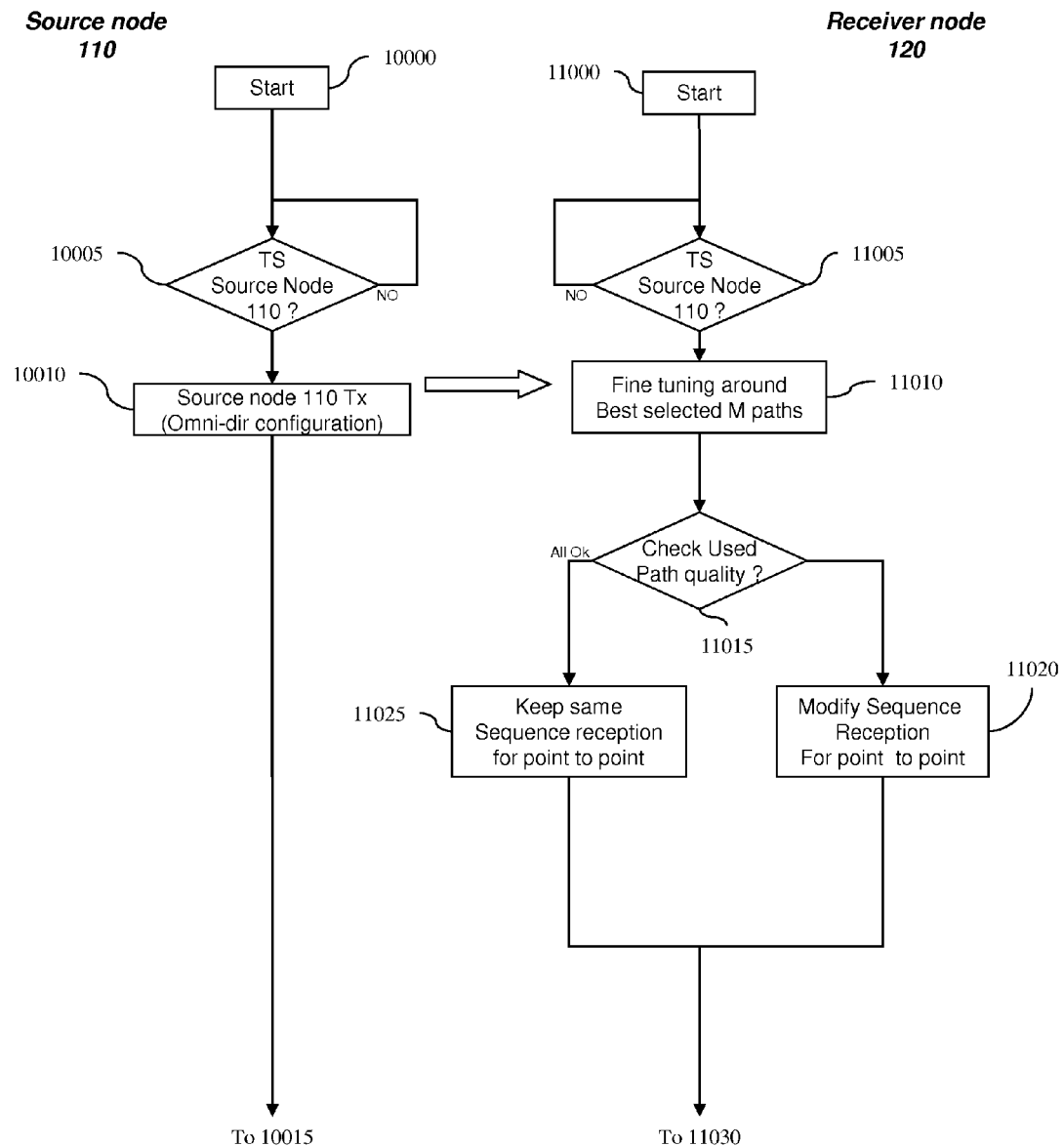
FIG. 8a illustrates operations for multi-path association adjustment performed by a source node and a receiver node at the start of each TDM network cycle according to a particular embodiment of the invention.
Figure 8B:
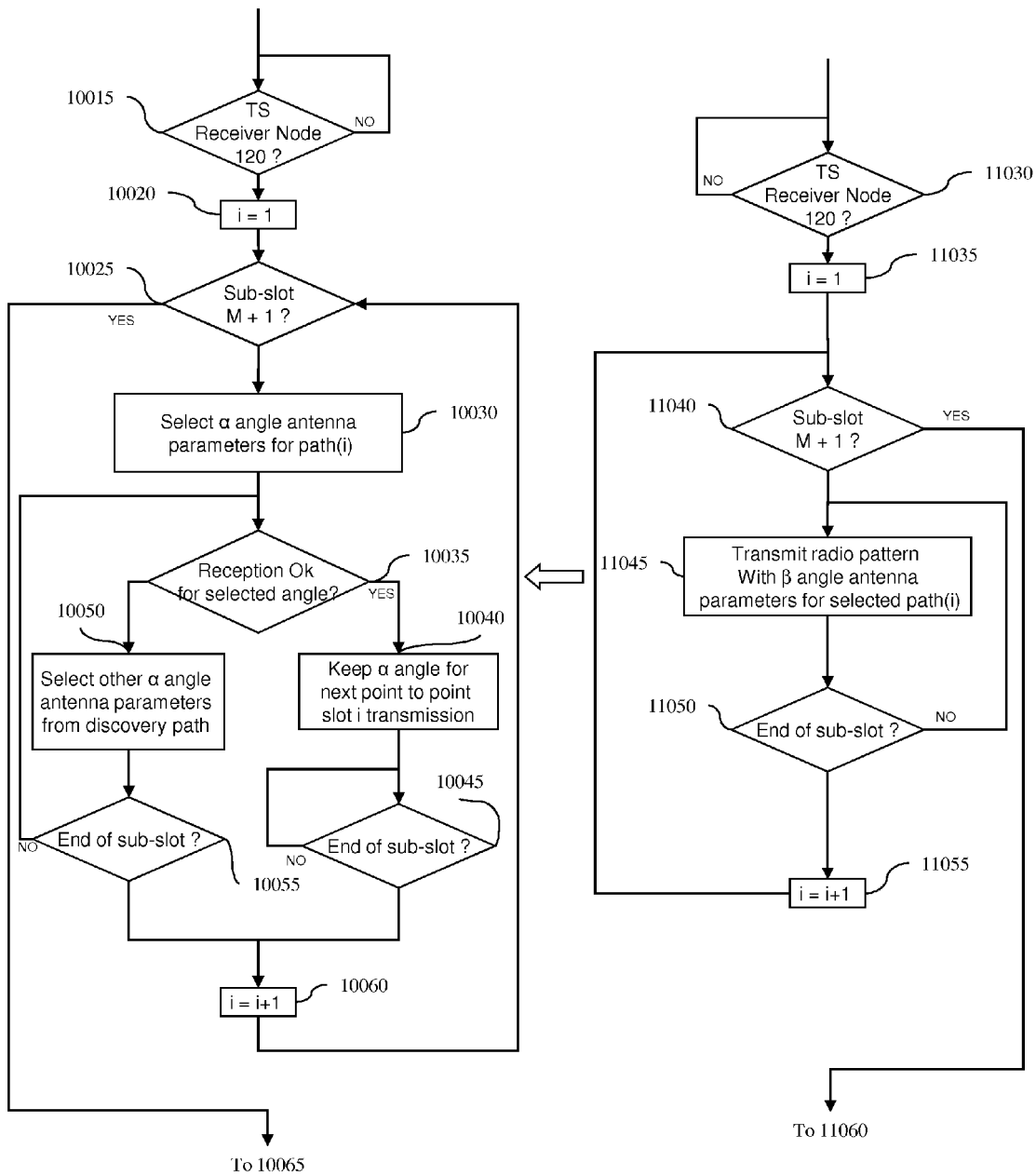
FIG. 8b illustrates operations for multi-path association of configuration time slot according to a particular embodiment of the invention.
Figure 8C:
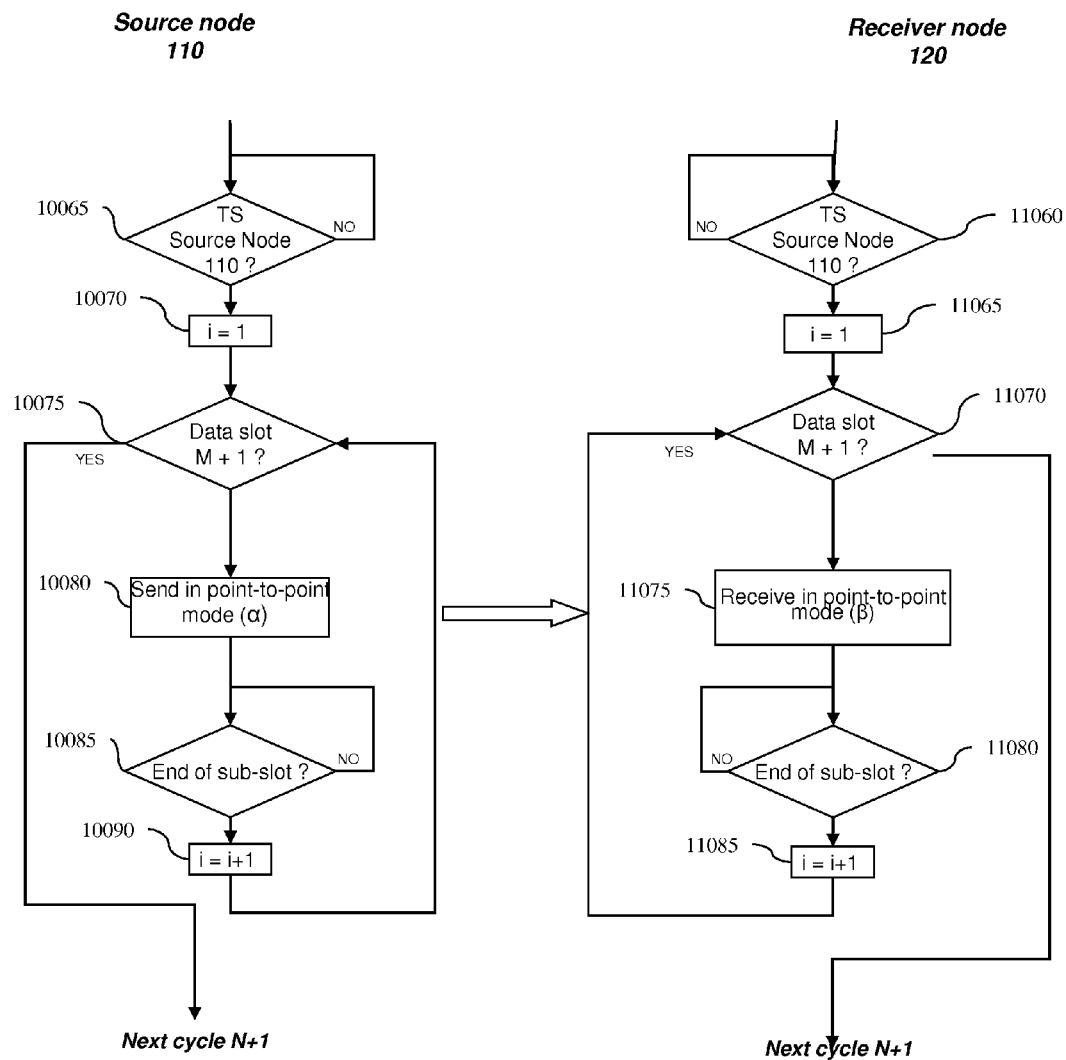
FIG. 8c illustrates operations for multi-path association adjustment performed by a source node and a receiver node during point-to-point communication period according to a particular embodiment of the invention.

Upon reception of this "Best_Angle" table (positive test at step 655), the source node 110 is ready for communication with the receiver node 120 as explained according to the algorithms illustrated in FIGS. 8a, 8b and 8c.

At step 675, the receiver node 120 sets its receiving antenna configuration in the narrow mode and waits for reception of a "Disco_Narrow_Start" message from the source node 110. Upon reception of the "Disco_Narrow_Start" message, the receiver node 120 sets its transmitting antenna configuration in the omnidirectional mode (or "Wide" mode) and transmits an "ACK" message to the source node 110 (step 680) in order to proceed to the next steps of the initialization procedure. When receiving the "Disco_Narrow_Start" message, the receiver node 120 extracts from it the settings value of the sender antenna orientation α relative to the source node 110. In this way, the receiver node 120 can start measurement of the quality of reception according to a receiver antenna orientation β, corresponding to the settings of the sender antenna orientation α(θ$_s$, φ$_s$).

At step 685, the receiver node 120 sets its receiver antenna orientation β (i.e. the orientation of the receiver antenna set in the narrow mode) to the initial value β (θ$_r$=−90, φ$_r$=−90).

At step 690, the receiver node 120 performs RSSI measurements and store the result of the measurement in a table "RSSI(α, β)".

At step 695, a test is performed to verify if RSSI measurements have been performed according to a determined fixed θ$_r$ value and all φ$_r$ (from −90° to 90°) values. In other words, this test 695 verifies that (φ$_r$=90°.

If the test 695 is negative, then the value of φ$_r$ is increased (for example with a pace of +5° (step 700)), and a next RSSI measurement phase (step 690) is performed according to a new receiver antenna orientation β, where θ$_r$ remains at the same value as the one used during the previous RSSI measurement phase and φ$_r$ is the new value obtained after step 700.

On the other hand, if the test 695 is positive (i.e. RSSI measurements have been performed by the receiver node 120 according to the determined fixed θ$_r$ value and all φ$_r$ (from −90° to 90°) values), then a test is performed (step 705) to verify if RSSI measurements have been performed according to all θ$_r$ values (from −90° to 90°). In other words, this test 705 verifies that φ$_r$=90°.

If the test 705 is negative, then the value of θ$_r$ is increased (for example with a pace of)+5° and φ$_r$ is set to value −90 (step 710), and a next RSSI measurement phase (steps 690, 695, 700) is performed according to a new receiver antenna orientation β, where θ$_r$ is the new value obtained after step 710 and φ$_s$ will vary from −90° to 90° (step 695, 700).

On the other hand, if the test 705 is positive (i.e. RSSI measurements have been performed by the receiver node 120 according to all θ$_r$ value and all φ$_r$ values for one specific orientation α(θ$_s$, φ$_s$) of the sender antenna of the source node 110), then a test is performed (step 715) to verify if RSSI measurements have been performed according to all orientation α(θ$_s$, φ$_s$) of the sender antenna of the source node 110. In other words, this test 715 verifies that (θ$_s$, φ$_s$)=(90°, 90°).

If the test 715 is negative, then a return to step 675 is performed and the receiver node 120 waits for the source node to start a new discovery phase with a new sender antenna orientation α.

On the other hand, if the test 715 is positive, then the receiver node 120 executes (step 720) a selection algorithm (described here below in relation to FIG. 7b) for obtaining the best transmission paths to use in the time sequence 300 reserved for data transmission in point-to-point mode (i.e. "Best_Angle" table). This selection algorithm makes the receiver node 120 to select one or several sets of α and β values (i.e. best transmission paths) from RSSI measurements.

It is to note that the time between step 680 and the detection of a positive test at step 705 corresponds to the minimum time to be set as "Tdisco_3d".

After obtaining "Best_Angle" table (i.e. best transmission paths), the receiver node 120 sets its transmitting antenna configuration in the omnidirectional mode (or "Wide" mode) and transmits this "Best_Angle" table to the source node 110 (step 725).

FIG. 7b illustrates an example of a selection algorithm executed by the receiver node 120 (at step 720 in FIG. 7a) for obtaining the best transmission paths to use during the time sequence 300 reserved for data transmission in point-to-point mode (i.e. "Best_Angle" table).

At step 800, the receiver node 120 sets a first variable corresponding to the sender antenna orientation α to value α (θ$_s$=−90, φ$_s$=−90). This first variable will guarantee that the receiver node 120 will search maximum RSSI position according to all orientation (α, β).

At step 805, the receiver node 120 sets a second variable corresponding to the receiver antenna orientation β to value β (δ$_r$=−90, φ$_r$= . . . ), where . . . means the value is not significant as the algorithm described hereafter in relation to FIG. 7c will manage this value. This second *variable* will guarantee that the receiver node 120 will search maximum RSSI position according to all orientations α and β.

At step 810, the algorithm of FIG. 7c is executed. As such, search of maximum RSSI is performed according to:
- fixed sender antenna orientation $\alpha(\delta s, \phi s)$;
- fixed receiver antenna angle $\theta r$;
- variable receiver antenna angle $\phi r$. For example, $\phi r$ varies from $-90$ to $+90$, by pace of $5°$.

Once executed, the algorithm returns $\phi_r$ angles, where RSSI reach a maximum value. These angles are stored in a table, called hereafter "PathTable". This "PathTable" stores RSSI maximum values and the respective orientation sets ($\alpha$, $\beta$) corresponding to the orientation of the sender antenna of the source node 110 and the orientation of the receiver antenna of the receiver node 120.

At step 825, a test is performed to verify if RSSI maximum values have been searched according to all $\theta_r$ values (from $-90°$ to $90°$). In other words, this test 825 verifies that $\theta_r = 90°$.

If the test 825 is negative, then at step 830 the value of $\theta r$ is increased (for example with a pace of $+5°$). Then a return at step 810 is performed. In other words, the algorithm of FIG. 7c is executed for the value of $\theta r$ obtained after step 830.

On the other hand, if the test 825 is positive, then at step 835, a test is performed to verify if RSSI maximum values have been searched according to all $\phi_s$ values (from $-90°$ to $90°$). In other words, this test 835 verifies that $\phi_s = 90°$.

If the test 835 is negative, then at step 840 the value of $\phi s$ is increased (for example with a pace of $+5°$). Then a return at step 810 is performed. In other words, the algorithm of FIG. 7c is executed for the new sender antenna orientation $\alpha$, where $\theta s$ remains at the same value as the one used during the previous maximum RSSI research and $\phi s$ is the new value obtained after step 840.

On the other hand, if the test 835 is positive (i.e. for a fixed value $\theta_s$, RSSI maximum research has been done for all sender antenna angle $\phi_s$, and all receiver antenna orientation $\beta$) then at step 845, a test is performed to verify if RSSI maximum values have been searched according to all $\theta_s$ values (from $-90°$ to $90°$). In other words, this test 835 verifies that $\theta_s = 90°$.

If the test 845 is negative, then the value of $\theta_s$ is increased (for example with a pace of)$+5°$ and $\phi_s$ is set to value $-90°$ (step 850), and a next RSSI maximum research (steps 805, 810, 825, 830) is performed according to a new sender antenna orientation $\alpha$, where $\theta_s$ is the new value obtained after step 850 and $\phi_s$ will vary from $-90°$ to $90°$ (steps 835, 840).

On the other hand, if the test 845 is positive (i.e. RSSI maximum values have been searched according to all orientation sets ($\alpha$, $\beta$), then all detected RSSI maximum values and the respective orientation sets ($\alpha$, $\beta$) are stored in the "PathTable".

At step 855, elements (i.e. sets ($\alpha_{sel}$, $\beta_{sel}$)) of the "PathTable" are sorted in descending order of RSSI value. Thus, the best transmission paths to use during the time sequence 300 reserved for data transmission in point-to-point mode are located at the top of the sorted table.

At step 860, the first set ($\alpha_{sel}$, $\beta_{sel}$) (which is located at the top of the table) of the sorted "PathTable" is selected and stored into a "Best_Angle" table. The selected set ($\alpha_{sel}$, $\beta_{sel}$) is then removed from the sorted "PathTable" in order to avoid using same set twice.

At step 865, all the sets ($\alpha$, $\beta$)(called hereafter "TX neighbor") for which the sender antenna orientation $\alpha$ is near the sender antenna orientation $\alpha_{sel}$ (selected at step 860) are removed from the sorted "PathTable". This permits to avoid using two transmission paths that would suffer from same disturbance (i.e. shadowing). In order to proceed to this removal, the algorithm verifies that for the selected orientation $\alpha_{sel}$ ($\theta S_{sel}$, $\phi S_{sel}$), all other set $\alpha$ ($\theta_s$, $\phi_s$) of the "PathTable" verify the following relation:

$$[(\theta S_{sel}+\Delta\theta)<\theta_s \text{ or } \theta_s<(\theta S_{sel}-\Delta\theta)] \text{ and } [(\phi S_{sel}+\Delta\phi)<\phi_s \text{ or } \phi_s<(\phi S_{sel}-\Delta\phi)]$$

Where $\Delta\theta$ corresponds to an angle variation where two nodes are considered having their antenna pointing in the same direction. In one embodiment, for example $\Delta\theta = 15°$.

At step 870, all the sets ($\alpha$, $\beta$)(called hereafter "RX neighbor") for which the receiver antenna orientation $\beta$ is near the receiver antenna orientation $\beta_{sel}$ (selected at step 860) are removed from the sorted "PathTable". This permits to avoid using two transmission paths that would suffer from same disturbance (i.e. shadowing). In order to proceed to this removal, the algorithm verifies that for the selected orientation $\beta_{sel}$ ($\theta r_{sel}$, $\phi r_{sel}$), all other set $\beta$ ($\theta_r$, $\phi_r$) of the "PathTable" verify the following relation:

$$[(\theta r_{sel}+\Delta\theta)<\theta_r \text{ or } \theta_r<(\theta r_{sel}-\Delta\theta)] \text{ and } [(\phi r_{sel}+\Delta\phi)<\phi_r \text{ or } \phi_r<(\phi r_{sel}-\Delta\phi)]$$

Where $\Delta\theta$ corresponds to an angle variation where two nodes are considered having their antenna pointing in the same direction. In one embodiment, for example $\Delta\theta = 15°$.

At step 875, a test is performed to verify if there is still element (i.e. set ($\alpha$, $\beta$)) in the "PathTable". If the test 875 is positive, it means that it might have other set ($\alpha$, $\beta$) that could be selected for becoming a possible transmission path to use during the time sequence 300 reserved for data transmission in point-to-point mode. Then, steps 860, 865 and 870 are repeated.

On the other hand, if the test 875 is negative, then elements stored in the "Best_Angle" table represent the best transmission paths to use during the time sequence 300 reserved for data transmission in point-to-point mode, as described hereafter in relation to FIGS. 8a, 8b and 8c. Then, the elements (i.e. sets ($\alpha$sel, $\beta$sel)) of the "Best_Angle" table are sorted in descending order of RSSI value.

FIG. 7c illustrates an example of a research algorithm executed by the receiver node 120 (at step 810 in FIG. 7b) for searching RSSI maximum value from RSSI($\alpha$, $\beta$) measurements obtained at step 690 in FIG. 7c and stored in the RAM 6002 (FIG. 6). For example, this search algorithm is stored in the ROM 6003 and executed by the microcontroller 6001.

One RSSI($\alpha$, $\beta$) measurement, where:
- $\alpha$ is the set of angle ($\theta_s$, $\phi_s$), where $\theta_s$ and $\phi_s$ are fixed values;
- $\beta$ is the set of angle ($\theta_r$, $\phi_r$), where $\theta_r$ is a fixed value and $\phi_r$ varies from $-90$ to $+90$, by a pace of $5°$, corresponds to a signal level curve to analyze.

The steps of the algorithm described here below are performed for each of the signal level curve stored in the RAM 6002.

At start-up of the system (step 900), the receiver node 120 has not yet initialized the "PathTable" table stored in its RAM. Variables "$\phi_r$" is initialized on first angle of value $-90°$ and "a", corresponding to the number of RSSI maximum value found, is initialized with the value "0".

At step 905, a filtering is performed on the original signal level curve (here below denoted as "level_signal") stored in the RAM 6002 of the receiver node 120. At the end of this step 905, a filtered curve is obtained, here below denoted as "level_signal_filter". In a particular embodiment of the invention, the filtering implemented at step 905 may consist in applying a sliding average on, for example, ten points of the original "level_signal" curve.

At step 910, the derivatives of the different points of the filtered curve "level_signal_filter" are computed. The derivatives computed for the different points are noted here below "level_signal_filter ($\phi_r$)". The derivatives of the different points are obtained from the following formula:

$$(\text{level\_signal\_filter}(\phi_r))' = ((\text{level\_signal\_filter}(\phi_r+\text{pace})' \text{level\_signal\_filter}(\phi_r-\text{pace}))/(2*\text{pace})).$$

This formula is well known to those skilled in the art.

The purpose of steps 915, 920, 925 and 930 described here below is that the microcontroller 6001 of the receiver node 120 should identify and temporarily store the local maximum value or values of the filtered curve "level_signal_filter" in the RAM 6002 of the receiver node. As shall be seen here below, the identification of the local maximum values is done by detecting the change in sign of the derivative for the successive points.

Steps 915, 920, 925 and 930 are repeated so long as the variable "$\phi_r$" has not reached the maximum antenna angle value, for example +90°.

At step 915, the sign of the derivative of the successive points "$\phi_r$" and "$\phi_r$+pace" is analyzed. Furthermore, the signal level received (RSSI) for the angle value "$\phi_r$+pace" is compared with a threshold S1. This threshold S1 represents the signal level received from which the receiver node 120 is capable of communicating with a given node in sending mode. The level of the threshold S1 is stored in a variable "threshold_S1".

The analysis performed at step 915 can be formulated as follows:
  if the sign of the derivative for the point corresponding to the antenna orientation angle "$\phi_r$" is positive; and
  if the sign of the derivative for the point corresponding to the antenna orientation angle "$\phi_r$+pace" is negative; and
  if the signal level received (RSSI) for the antenna angle value "$\phi_r$+pace" is greater than the threshold "threshold_s1";
  then the presence of a local maximum value is detected at the point corresponding to the antenna angle value "$\phi_r$+pace", and the operation passes to a step 925; otherwise, the operation passes to a step 930.

At step 925, the antenna orientation angle corresponding to the local maximum value detected at step 915 is stored at the line "a" of a table here below denoted as "max_local". The variable "a" is then incremented by one unit so that the next local maximum value is recorded at the next row of the "max_local" table.

At step 930, a test is performed to verify if the variable "$\phi_r$" has reached the maximum antenna angle value, for example +90°. If the test 930 is positive, then the operation passes to a step 935, otherwise it passes to a step 920.

At step 920, the variable "$\phi_r$" is incremented by a pace, for example of 5°. Then, the operation returns to step 915 for analyzing the next antenna angle value.

At step 935, for each detected local maximum value "max_local(a)", the following parameters are stored in the "Path-Table" table:
  the sender antenna orientation α ($\theta_s$, $\phi_s$) of the source node 110;
  the receiver antenna orientation β ($\theta_r$, $\phi_r$(max_local(a))) of the receiver node 120; and
  the RSSI value for this maximum "max_local(a)": RSSI(α, β).

FIGS. 8a to 8c illustrate an example of operations executed by the source node 110 and the receiver node 120 in the frame of a multi-path association adjustment for point-to-point mode.

FIG. 8a illustrates operations performed by the source node 110 and the receiver node 120 at the start of each TDM network cycle 320.

At source node side, upon detection of a start of a TDM cycle (step 10000), the source node 110 waits (step 10005) for its time slot 2202 in the time sequence 301 reserved for transmission in configuration mode. Upon detection of its time slot 2202, the source node 110, with a omnidirectional transmitting antenna configuration, sends its data to all the other nodes of the network (step 10010).

Then, step 10015, described hereafter in relation to FIG. 8b is performed.

At receiver node side, upon detection of the start of the TDM cycle (step 11000), the receiver node 120 waits (step 11005) for the time slot 2202 allotted to the source node 110 in the time sequence 301 reserved for transmission in configuration mode. Upon detection of the time slot 2202, the receiver node 120 verifies if some of the transmission paths that are intended to be used during the point-to-point communication period 300 suffer from disturbance due to shadowing effect.

For this end, at step 11010, for each of the transmission paths that are intended to be used during the point-to-point communication period 300, the receiver node 120 sets its receiver antenna according to the orientation β corresponding to the transmission path and measures the received signal quality level (RSSI) before memorizing it.

Then at step 11015, for each of the transmission paths that are intended to be used during the point-to-point communication period 300, the receiver node 120 verifies if RSSI values measured from the last Z TDM cycle (for example "Z" is set to 10 TDM cycles) are sufficient for the receiver node 120 for communicating with the sender node 110. As described above in relation to FIG. 7c RSSI values could be compared with a predetermined threshold "S1", such that if during the last Z comparisons it is detected that RSSI values are lower than "threshold_s1", then the transmission path is considered to be not valid for point-to-point communication.

If after step 11015, none of the used path failed to verify quality criteria, then there is no modification of point-to-point communication period.

If after step 11015, one of the paths is considered as no more relevant, then step 11020 is performed and receiver node selects a new communication path according to spatial diversity criterion, then modifying point to point communication period. This selection depends on the number of elements (i.e. transmission paths) selected (at step 810 in FIG. 7b) from the "Best_Angle" table.

Indeed, if the number of time slots in the point-to-point communication period 300 is lower than the number of transmission paths (corresponding to a set ($\alpha_{sel}$, $\beta_{sel}$)) selected from the "Best_Angle" table, then the receiver node 120 could replace the disturbed transmission path by a new transmission path selected from the "Best_Angle" table and that is not already used during the point-to-point communication period 300.

For example, for an initial 4 point-to-point transmission paths sequence A-B-C-D (where A, B, C, D are the four best transmission paths of the "Best_Angle" table), if path B is no more valid, then the receiver node 120 could select the fifth best transmission path E stored in the "Best_Angle" table in order to define a new 4 point-to-point transmission path sequence A-E-C-D.

In the other hand, if the number of time slots in the point-to-point communication period 300 is greater than or equal to the number of transmission paths selected from the "Best_Angle" table or if the number of remaining relevant transmission paths in the "Best_Angle" table is lower than or equal to the number of time slots in the point-to-point communication period 300, the receiver node should use at least one transmission path more than one time. In such a case, the receiver node 120 selects from the transmission paths stored in the "Best_Angle" table, the one that satisfies a first criterion (Criterion 1) that can be formulated as follows:

a same transmission path should not be used in two adjacent time slots in the point-to-point communication period 300.

If the first criterion is not satisfied, then the receiver node 120 selects from the transmission paths stored in the "Best_Angle" table, the one that satisfies a second criterion (Criterion 2) that can be formulated as follows:

use the less disturbed transmission path from the transmission paths stored in the "Best_Angle" table.

For example, for an initial 4 point-to-point transmission paths sequence A-B-C-D (where A, B, C, D are the only transmission paths of the "Best_Angle" table), if path B is no more valid, then the receiver node 120 should select a transmission path between paths A, C or D. In that case it will define a new 4 point-to-point transmission path sequence A-D-C-D, which is compliant with the first criterion (Criterion 1). In the case where path D (as path B) becomes temporary no more valid, the receiver node 120 will define a new 4 point-to-point transmission path sequence A-A-C-A (if path A is less disturbed than path C) or A-C-C-C (if path C is less disturbed than path A) according to the second criterion (Criterion 2).

Then, step 11030, described hereafter in relation to FIG. 8b is performed.

FIG. 8b illustrates operations performed by the source node 110 and the receiver node 120 during configuration time slot 2203. These operations aim at associating one transmission path with each communication time slot.

At source node side, the source node 110 waits (step 10015) for the time slot 2203 allotted to the receiver node 120 in the time sequence 301 reserved for transmission in configuration mode. Upon detection of the time slot 2203, the source node 110 initializes (step 10020) a counter variable "i" to the value 1. This variable "i" is used in step 10025 in order to verify if the association of the M transmission paths of the point-to-point communication period is performed (one transmission path per communication time slot). This is done by checking that the value of variable "i" is equal to M+1. If the test 10025 is positive, then the receiver node 120 ends its transmission in the M configuration sub-slots, to enable the multi-path association, and the source node 110 performs step 10065, to manage point-to-point mode communication period.

On the other hand, if the test 10025 is negative, then it means that another association of transmission path needs to be performed.

At receiver node side, the receiver node 120 waits (step 11030) for its time slot 2203. Upon detection of its time slot 2203, the receiver node 120 initializes (step 11035) a counter variable "i" to the value 1. This variable "i" is used in step 11040 in order to verify if the association of the M transmission paths of the point-to-point data transfer is performed (one transmission path per communication time slot). This is done by checking that the value of variable "i" is equal to M+1. If the test 11040 is positive, then the receiver node 120 ends to transmit in the M configuration sub-slots, to enable the multi-path association, and the source node 110 performs step 11060, to manage point-to-point mode communication period.

On the other hand, if the test 11040 is negative, then it means that another association of transmission path needs to be performed.

In order to perform the multi-path association, the source node 110 first selects the sender antenna orientation α that is used for data transmission on the $i^{th}$ path of the previous point-to-point communication period (step 10030). This sender antenna orientation α is then used for the settings of the receiver antenna of the source node 110.

During the same time slot, the receiver node 120 selects the receiver antenna orientation 13 (selected from step 11020 or 11025) that is used during data exchange on the $i^{th}$ path of the next point-to-point communication period (step 11045). This receiver antenna orientation 13 is then used for the settings of the sender antenna of the receiver node 120. Then the receiver node 120 transmits a radio pattern (i.e. predetermined radio signal) to the source node 110. Such radio pattern enables the source node 110 to either select another path (by steps 10030-10050) or either confirm (by steps 10030-10040) path association for data point-to-point communication period.

After step 10030, the source node 110 is:

either able to receive from the receiver node 120 (test 10035 is positive). In that case, the source node 110 memorizes (step 10040) that antenna orientation α is the sender antenna orientation of the $i^{th}$ communication time slot. Then a test is performed to detect the end of the time slot 2203 (step 10045);

or unable to receive correctly from the receiver node 120 (test 10035 is negative) (for example because receiver node 120 has changed its transmission angle). In that case, the source node 110 selects (step 10050) from "Best_Angle" table another antenna orientation α in order to verify that the receiver node 120 does not modify path association (after step 11020). This verification, is performed during time slot "i" duration by detecting the end of the time slot 2203 in step 10055. If the test 10055 is negative, then a return at step 10035 is performed. If the test 10055 is positive, it may mean that the source node 110 has not checked the entire antenna orientation α of the "Best_Angle" table, it could then memorizes last set tested, and after initial path checking in next TDM cycle, restarts other angle test from this memorized antenna orientation α.

In all case, if one of the tests 10055 or 10045 is positive, the source node 110 increases the value of variable "i" (step 10060) by one unit, and then a return at step 10025 is performed in order to verify if all path association is performed for next point-to-point communication periods.

After step 11045, the receiver node 120 verifies if the time slot 2203 is finished (step 11050). If the test 11050 is negative, the receiver node 120 continues to transmit radio pattern with antenna orientation β (i.e. a return at step 11045 is performed).

On the other hand, if the test 11050 is positive, the receiver node 120 increases the value of variable "i" (step 11055) by one unit, then a return at step 11040 is performed in order to verify if all path association is performed for next point-to-point communication periods.

FIG. 8c illustrates operations performed by the source node 110 and the receiver node 120 during the point to point communication period 300.

At source node side, the source node 110 waits (step 10065) for a communication time slot allotted to it in the point-to-point communication period 300. Upon detection of a communication time slot, the source node 110 initializes (step 10070) a counter variable "i" to the value 1. This variable "i" is used in step 10075 in order to verify if the transmission of the M transmission paths of the point-to-point communication period is performed. This is done by checking that the value of variable "i" is equal to M+1. If the test 10075 is positive, then the source node 110 ends to transmit in the M communication time slots (2401, 2402, 2403, 2404) and the source node 110 returns back to initial step 10000, to manage next TDM cycle (Cycle N+1).

On the other hand, if the test 10075 is negative, then it means that another transmission in point-to-point mode needs to be performed. In order to perform the point-to-point data transmission, the source node 110 selects the antenna orientation α determined during the $i^{th}$ step 10050 or 10040 of the transmission configuration mode 301 of the current TDM cycle. This antenna orientation α is used for setting sender antenna of the source node 110 in order to transmit data (step 10080). If at step 10050 a convenient transmission path (i.e. antenna orientation α) has not yet been found, then the source node 110 uses the last antenna orientation α determined as convenient.

Then a test is performed (step 10085) to detect if the $i^{th}$ point-to-point transmission time slot has elapsed. If the test 10085 is positive, then the source node 110 increases the value of variable "i" (step 10090) by one unit, then it returns back to the test 10075, to verify if transmission of data has been performed in all the communication time slots (2401, 2402, 2403, 2404).

At receiver node side, the receiver node 120 waits (step 11060) for a communication time slot allotted to the source node 110 in the point-to-point communication period 300. Upon detection of a communication time slot, the receiver node 120 initializes (step 11065) a counter variable "i" to the value 1. This variable "i" is used in step 11070 in order to verify if the reception of the M transmission paths of the point-to-point data transfer is performed. This is done by checking that the value of variable "i" is equal to M+1. If the test 11070 is positive, then the source node 110 ends to transmit in the M communication time slots (2401, 2402, 2403, 2404) and the receiver node 120 returns back to initial step 10000, to manage next TDM cycle (Cycle N+1).

On the other hand, if the test 11070 is negative, then it means that another transmission in point-to-point mode will occurred. In order to receive data transmission in communication time slot, the receiver node 120 selects the antenna orientation β (step 11075), that it has selected for the $i^{th}$ transmission path after step 11020 or 11025 of the current TDM cycle.

Then a test is performed (step 11080) to detect if the $i^{th}$ point-to-point transmission time slot has elapsed. If the test 11080 is positive, then the receiver node 120 increases the value of variable "i" (step 10090) by one unit, then it returns back to the test 11070, to verify if transmission of data has been performed in all the communication time slots (2401, 2402, 2403, 2404).

Figure 9A:
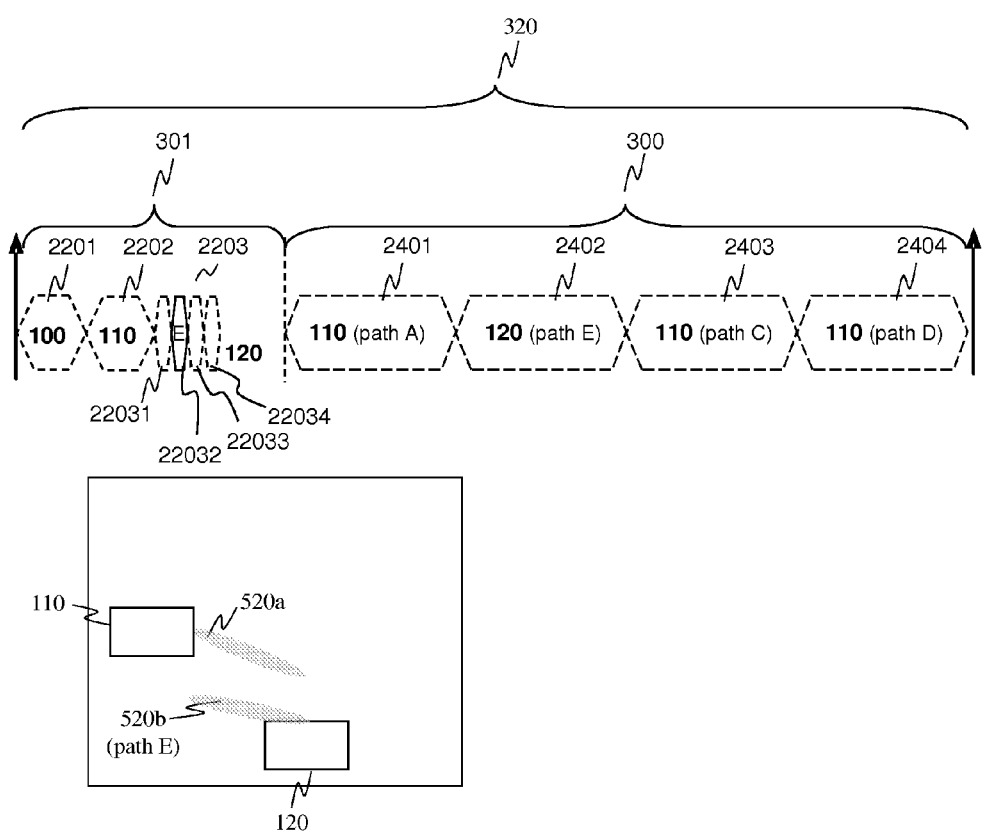
FIG. 9a illustrates a communication scheme in which a previously used path for point-to-point transmission is no longer valid and is requested to be replaced by a new path E which is unknown according to a particular embodiment of the invention.

FIG. 9a illustrates a communication scheme in which the previously used path B for the point-to-point transmission (in time slot 2402) is no longer valid and is requested by the receiver node 120 to be replaced by a new path E which is unknown by the source node 110, and so has to be discovered.

As previously indicated, there is still a unique association done between:
- the sub access slots (also called configuration sub-slots) 22031, 22032, 22033 and 22034 of the time slot 2203 reserved for the receiver node 120 to transmit in the configuration mode 301;
- and each time slot 2401, 2402, 2403 and 2404 of the sequence 300 reserved for data transmission in point-to-point mode.

In the example of FIG. 9a the second configuring time slot 22032 is dedicated for the antenna tuning for the second communication time slot 2402 corresponding to path B, but that has now to correspond to path E.

If during the verification by its receiver antenna, i.e. during the current second configuring time slot 22032 of the time slot 2203 reserved for the receiver node 120 to make transmission in the configuration mode, the source node 110 has detected that path B previously used is no longer valid, in other words, if the antenna orientation α (enabling good reception at receiver node 120 of data sent by the source node 110) determined during the current TDM network cycle is different from the one determined during the previous TDM network cycle (or from a previous TDM network cycle), then the source node 110 determines if one of the other previously used paths (A, C or D) could be usable. In the current example, none of these paths (A, C or D) permits to receive signal with a suitable level. Then the source node 110 concludes that another transmission path E selected by the receiver node 120 has to be used. However, this new path E requires first to be discovered by the source node 110.

Figure 9B:
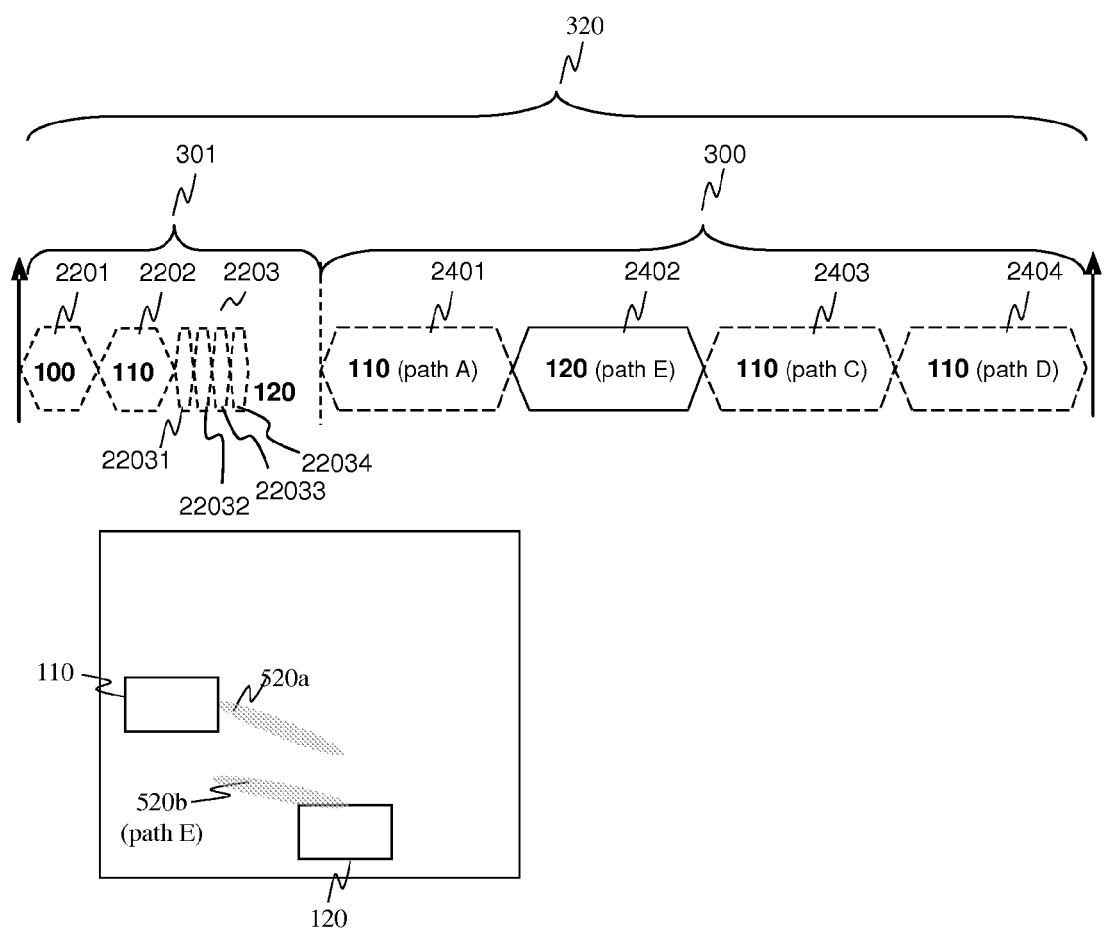
FIG. 9b illustrates a communication scheme implementing a path discovery method for searching a new communication path to use for point-to-point transmission according to a particular embodiment of the invention.

FIG. 9b illustrates a communication scheme implementing a path discovery method for searching a new transmission path to use in the point-to-point communication period.

As the transmission path associated to the second communication time slot 2402 is not yet defined, the source node 110 and the receiver node 120 cannot exchange payload data during this second communication time slot 2402. So the system takes profit of this unused communication time slot 2402 to perform a full scan from the source node 110 of the 3D space and to discover new transmission path to use.

Normally the second communication time slot 2402 is dedicated to point-to-point data transmission from the source node 110 to the receiver node 120. Because it is not possible to perform data transmission at that moment (because the transmission path is not determined), the receiver node 120 can send a predetermined radio signal with a directional transmitting antenna configuration 520b corresponding to path E. Simultaneously, the source node 110 performs a full scan of the 3D space in order to detect this predetermined radio signal coming from the receiver node 120 and then to adjust its antenna in such a way it receives the predetermined radio signal with the highest reception level. In other words, the source node 110 determines the antenna orientation α that enables it to receive the predetermined radio signal with the highest reception level.

The receiver antenna orientation β henceforth corresponds to the sender antenna orientation α that is to be used by the source node 110 for transmitting in point-to-point mode to the receiver node 120 during the time slot 2402 reserved for this purpose. The parameters for configuring the sender antenna for the point-to-point transmission are then determined as a function of the parameters for configuring the receiver antenna used by the source node 110 when the receiver node 120 sends the predetermined radio signal with a directional antenna configuration. To determine the configuration parameters of the receiver antenna enabling a point-to-point communication between the source node 110 and receiver node 120, the source node 110 can for example measure the received radio signal by means of the sub-block 6010 in making the receiver antenna orientation α vary by steps of 10 degrees in the zone of sensitivity of the antenna 500b (with a scan from −90 to +90 degrees), then when a maximum signal is detected, a refined scanning of 1-degree steps around the maximum signal value (from −5 degrees to +5 degrees) provides the orientation α giving it the best signal power level measured at reception.

The source node 110 takes profit of this scanning to use from now the corresponding antenna configuration parameters for the path E.

Figure 9C:
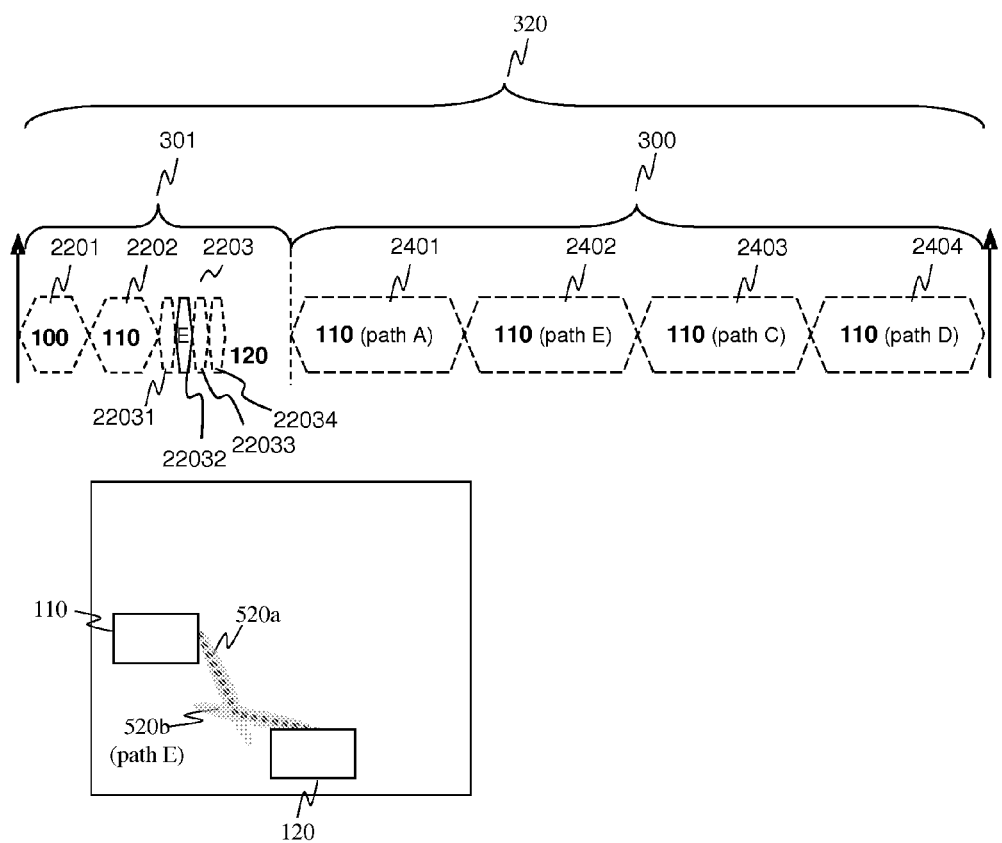
FIG. 9c illustrates a communication scheme in which a new path for point-to-point transmission has to be used for the first time according to a particular embodiment of the invention.

FIG. 9c illustrates a communication scheme in which the new path E for the point-to-point transmission has to be used for the first time, this step is done during the TDM network cycle following the one processed in FIG. 9b.

As previously indicated, there is considered a unique association done between:
- the sub access slots (also called configuration sub-slots) 22031, 22032, 22033 and 22034 of the time slot 2203 reserved for the receiver node 120 to transmit in the transmission configuration mode 301;
- and each time slot 2401, 2402, 2403 and 2404 of the sequence 300 reserved for data transmission in point-to-point mode.

In the example of FIG. 9c the second configuring time slot 22032 is dedicated for the antenna tuning for the second communication time slot 2402 that is associated to path E.

If during the verification by its receiver antenna, i.e. during the current second configuring time slot 22032 of the time slot 2203 reserved for the receiver node 120 to make transmission in the configuration mode, the source node 110 has detected that path E previously used is still valid, in other words, if the antenna orientation α (enabling good reception at receiver node 120 of data sent by the source node 110) determined during the current TDM network cycle is not different from the one determined during the previous TDM network cycle (or from a previous TDM network cycle), then it is possible to adjust the sending antenna parameters and the receiving antenna parameters for the point-to-point transmission pertaining to the current TDM network cycle 320. Such a configuration is here below called a tuning of a point-to-point transmission path.

To tune a point-to-point transmission path, the receiver node 120, during the configuring time slot 22032 reserved for it to transmit, sends a predetermined radio signal with a directional transmitting antenna configuration 520b corresponding to path E. During this same configuring time slot 22032, the source node 110 orients its receiver antenna according to the previous directional antenna configuration corresponding to path E. Then the source node 110 checks if the previous used path E is still suitable by swiveling its narrow beam 520a around the previous position and the source node 110 takes profit of this scanning to update the parameters to be used for the path E.

In fact the source node 110 determines an antenna orientation α enabling it to receive the predetermined radio signal coming from the receiver node 120 with the best signal power level measured at reception. This receiver antenna orientation β henceforth corresponds to the sender antenna orientation α that is to be used by the source node 110 for transmitting in point-to-point mode to the receiver node 120 during the time slot 2402 reserved for this purpose. The parameters for configuring the sender antenna for the point-to-point transmission are then determined as a function of the parameters for configuring the receiver antenna used by the source node 110 when the receiver node 120 sends the predetermined radio signal with a directional antenna configuration. To determine parameters for configuring the receiver antenna that enable point-to-point communication between the source node 110 and receiver node 120, the source node 110 can for example measure the received radio signal by means of the sub-block 6010 in making the receiver antenna orientation α vary by 1-degree steps around the value (from −5 degrees to +5 degrees) used in the previous TDM cycle and then selects the receiver antenna orientation α giving it the best signal power level measured at reception.

The source node 110 takes profit of this scanning to update the parameters to be used for the path E. Then in the next point-to-point sequence 300, the second communication time slot 2402 dedicated to path E can be used for data transmission from the source node 110 to the receiver node 120.

Figure 10:
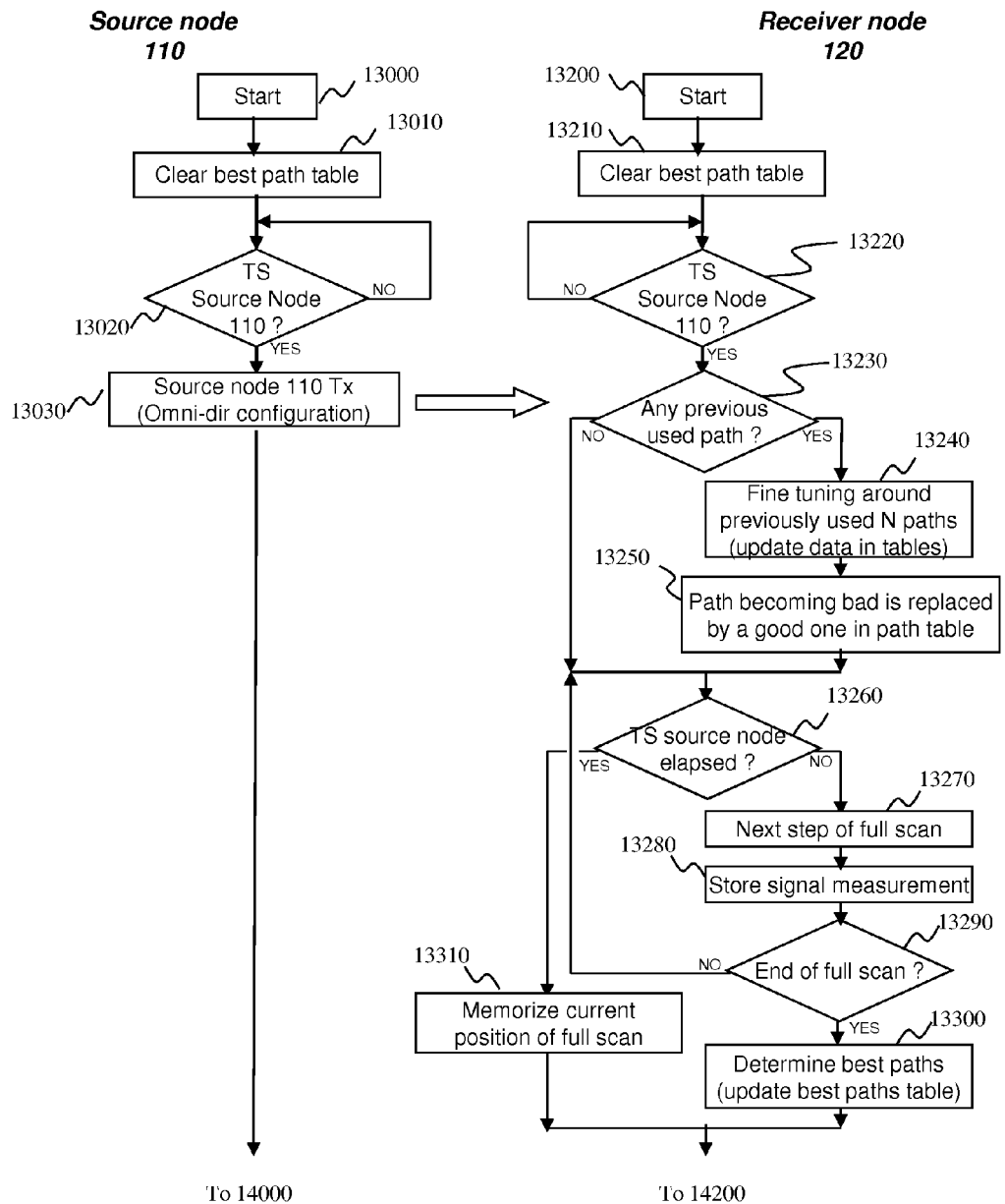
FIG. 10 illustrates operations for discovering new communication path(s) during a point-to-point communication period, performed by a source node and a receiver node at the start of each TDM network cycle according to a particular embodiment of the invention.
Figure 11:
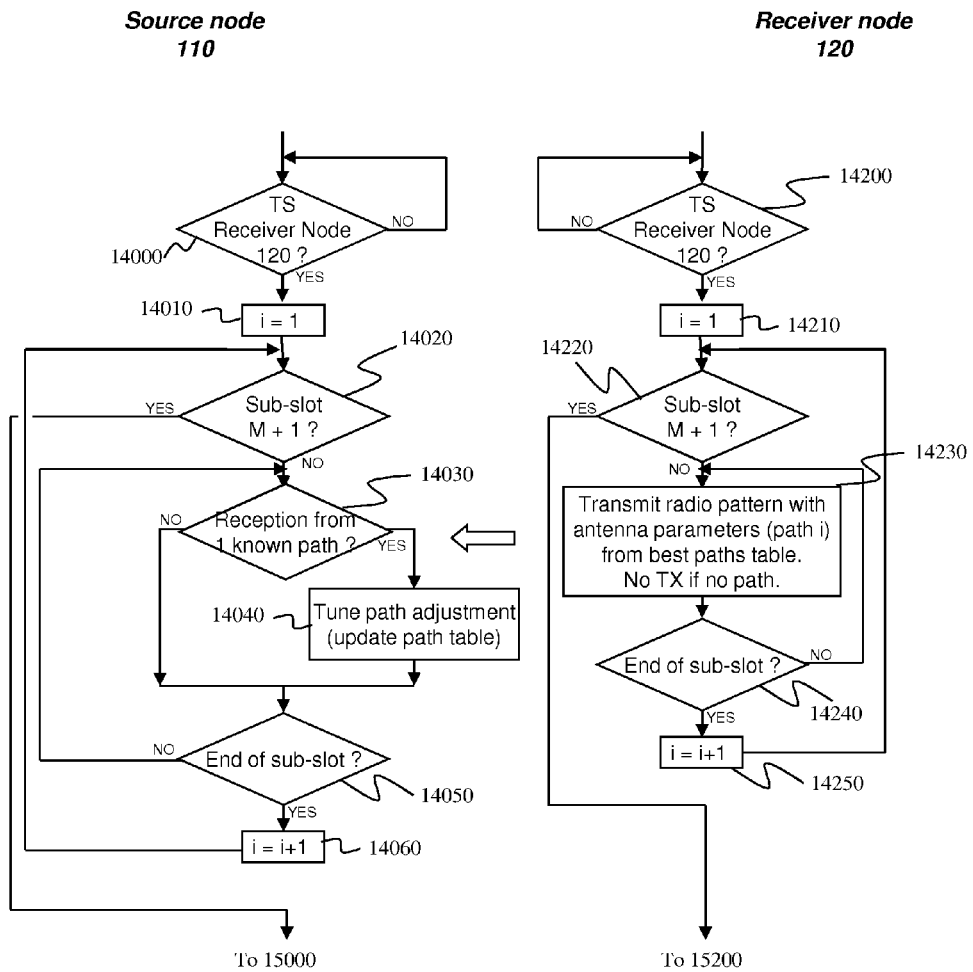
FIG. 11 illustrates operations for discovering new communication path(s) during a point-to-point communication period, performed by a source node and a receiver node during a configuration time slot according to a particular embodiment of the invention.
Figure 12:
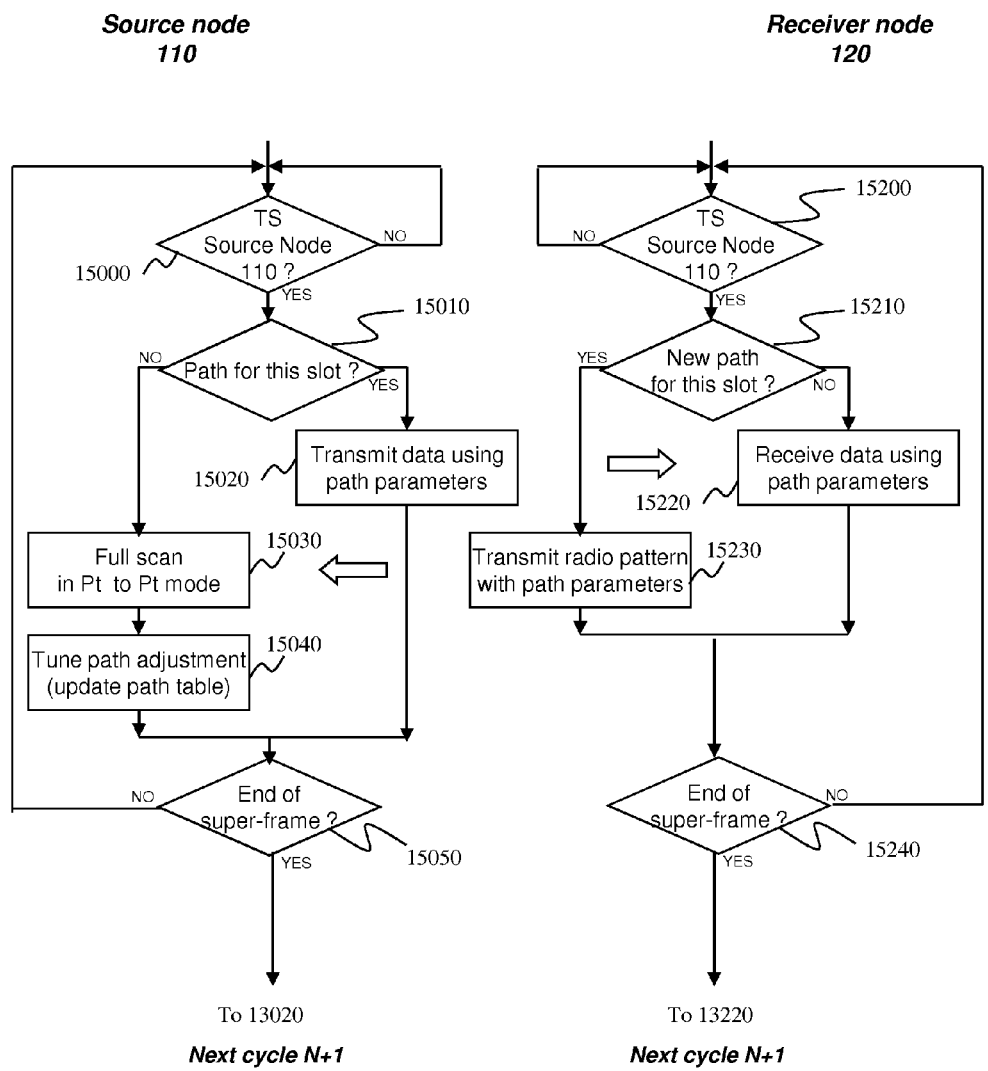
FIG. 12 illustrates operations for discovering new communication path(s) during a point-to-point communication period, performed by a source node and a receiver node during the point-to-point communication period according to a particular embodiment of the invention.

FIGS. 10 to 12 illustrate an example of operations executed by the source node 110 and the receiver node 120 in the frame of a discovery of new transmission path during the point-to-point communication period.

FIG. 10 illustrates operations performed by the source node 110 and the receiver node 120 at the start of each TDM network cycle 320. These operations aim at determining the possible transmission paths.

At source node side, upon detection of a start of a TDM cycle (step 13000), the source node 110 clears the data stored in the "PathTable" (step 13010) and waits (step 13020) for the time slot 2202 allotted to it in the time sequence 301 reserved for transmission in configuration mode. Upon detection of its time slot 2202, the source node 110, with a omnidirectional transmitting antenna configuration, sends its data (low bit-rate data, for example audio applications and/or control data) to all the other nodes of the network (step 13030).

Then step 14000, described hereafter in relation to FIG. 11 is performed by the source node 110.

At receiver node side, upon detection of the start of the TDM cycle (step 13200), the receiver node 120 clears the data stored in the "PathTable" (step 13210) and waits (step 13220) for the time slot 2202 allotted to the source node 110 in the time sequence 301 reserved for transmission in configuration mode. Upon detection of the time slot 2202, the receiver node 120 performs a test (step 13230) in order to verify if some point-to-point transmission paths have already been identified in the previous TDM cycle. If the test 13230 is negative, then it is necessary to perform a 3D space scanning to discover a transmission path and the receiver node 120 performs operation at step 13260.

On the other hand, if the test 13230 is positive, then the receiver node 120 performs fine tuning operation (step 13240). Thus, the receiver node 120 successively points its directional receiver antenna in the direction of the point-to-point transmission path(s) that has (have) been identified as valid during the previous TDM cycle. Then for each of these transmission paths, the receiver node 120 performs a scanning in reception with its directional receiver antenna and measures the power level of the signal received by means of the sub-block 6012. For example, scanning performed by the receiver antenna consist in making the orientation angle β vary by 1-degree steps around the transmission path values (from −5 degrees to +5 degrees) used in the previous TDM cycle and selecting the orientation angle β that gives the best signal power level measured at reception. The tuned antenna parameters for each point-to-point transmission path associated to each of the configuration sub-slots are updated in the "PathTable".

At step 13250, if one of the transmission paths used in the previous TDM cycle is no longer valid (for example due to an obstacle hiding the path), the system has to replace it by another valid transmission path and update in consequence the "PathTable". In the case there is no other valid path, a new-discovery has to be performed in a similar way as described in FIGS. 9a, 9b and 9c.

At step 13260, the receiver node 120 performs a test in order to verify if the time slot 2202 reserved for the source node 110 is over or not. In case the time slot 2202 is over, the receiver node 120 memorizes (step 13310) the current suspended position of the 3D space scanning before going to step 14200.

In case the time slot 2202 is not over, the receiver node 120 makes profitable use of the remaining available time of the current time slot 2202 (allotted to the source node 110 for transmission in configuration mode) to perform a measure of the RSSI of the signal received by means of the sub-block 6012.

It is to note that a full scan of the 3D space around the receiver antenna 500b would be longer than the remaining time of the time slot 2202, so the receiver node 120 resumes the scan from the latest 3D scan position reached during the previous TDM cycle (or at the first time starts from an initial position) and moves to the next position by incrementing the receiver antenna orientation angle β of, for example, 10 degrees in the zone of sensitivity of the antenna 500b (with a scan from −90 to +90 degrees).

Then the receiver node 120 stored the measured power level (step 13280), for example, in RAM 6002.

Next at step 13290, the receiver node 120 performs a test in order to verify if the full 3D space scanning around the receiver antenna 500b of the receiver node 120 has been completed. If it is not the case, then a return to step 13260 is performed. If the full 3D space scanning has been completed, then at step 13300 the receiver node 120 computes the RSSI peaks levels in order to update the table of the possible paths "PathTable".

Then step 14200, described hereafter in relation to FIG. 11 is performed by the receiver node 120.

FIG. 11 illustrates operations performed by the source node 110 and the receiver node 120 during the time slot 2203 allotted to the receiver node 120 in the time sequence 301 reserved for transmission in configuration mode. These operations aim at determining the transmission path to use during the time sequence 300 reserved for data transmission in a point-to-point mode.

At source node side, the source node 110 waits (step 14000) for the time slot 2203 allotted to the receiver node 120 in the time sequence 301 reserved for transmission in configuration mode. Upon detection of the time slot 2203, the source node 110 initializes (step 14010) a counter variable "i" to the value 1. This variable "i" corresponds to the index of a current configuring time slot of the time slot 2203. This variable "i" is used in step 14020 in order to verify if all the configuration sub-slots 22031, 22032, 22033 and 22034 have been processed; i.e. if one transmission path has been determined in each configuring time slot 22031, 22032, 22033 and 22034.

If the test 14020 is positive, then step 15000, described hereafter in relation to FIG. 12 is performed by the source node 110.

On the other hand, if the test 14020 is negative then the source node 110 orients its receiver antenna (step 14030) according to the directional antenna configuration for the configuring time slot determined in the previous TDM cycle 320. If no suitable signal level is detected, then the source node 110 redo the same operation successively with the other point-to-point transmission paths that have been identified as valid during the previous TDM cycle. If none of these previous transmission paths provides a suitable signal level, then step 14050 is directly performed. On the other hand, if one of the previous transmission paths is detected as being suitable for the current configuring time slot, then the source node 110 performs a path adjustment by making the orientation angle α of its receiver antenna vary by 1-degree steps around the path values (from −5 degrees to +5 degrees) used in the previous TDM cycle and then selects the orientation angle α that gives the best signal power level measured at reception. At step 14040 the tuned antenna parameters for the point-to-point transmission path associated to the current configuring time slot is updated in tables.

Then the source node 110 verifies if the current configuring time slot is over (step 14050). If the test at step 14050 is negative, then a return to step 14030 is performed, otherwise the source node 110 increases the value of variable "i" (step 14060) by one unit, and then a return to step 14020 is performed.

At receiver node side, the receiver node 120 waits (step 14200) for the time slot 2203 allotted to it in the time sequence 301 reserved for transmission in configuration mode. Upon detection of the time slot 2203, the receiver node 120 initializes (step 14210) a counter variable "i" to the value 1. This variable "i" corresponds to the index of a current configuring time slot of the time slot 2203. This variable "i" is used in step 14220 in order to verify if all the configuration sub-slots 22031, 22032, 22033 and 22034 have been processed; i.e. if one transmission path has been exchanged with sender node in each configuring time slot 22031, 22032, 22033 and 22034.

If the test 14220 is positive, then step 15200, described hereafter in relation to FIG. 12 is performed by the receiver node 120.

On the other hand, if the test 14220 is negative then the receiver node 120 sends during the current configuring time slot a predetermined radio signal with a directional transmitting antenna configuration 520b corresponding to the transmission path to be used during the respective communication time slot and determined during steps 13240 and 13250 (or 13300). It is recalled that there is a unique association between a configuring time slot and a directional path to 10 be used during a communication time slot.

In case there is no possible transmission path, the receiver node 120 does not transmit any predetermined radio signal during the current configuring time slot.

Then the receiver node 120 verifies if the current configuring time slot is over (step 14240). If the test at step 14240 is negative, then a return to step 14230 is performed, otherwise the receiver node 120 increases the value of variable "i" (step 14250) by one unit, and then a return to step 14220 is performed.

FIG. 12 illustrates operations performed by the source node 110 and the receiver node 120 during the point to point communication period 300.

At source node side, the source node 110 waits (step 15000) for a communication time slot allotted to it in the time sequence 300 reserved for data transmission in point-to-point mode. Upon detection of a communication time slot (called hereafter "current communication time slot") allotted to the source node 110, the source node 110 verifies (step 15010) if there is a valid point-to-point transmission path for the current communication time slot by reading the "PathTable".

If the test at step 15010 is positive, then the source node 110 sends (step 15020) its data in point-to-point mode to the receiver node 120 by using the corresponding antenna configuration parameters (i.e. angle set α). Then, the source node 110 performs step 15050.

On the other hand, if the test 15010 is negative then a path discovery (i.e. 3D scan) is performed by the source node 110 at step 15030. This is possible because the point-to-point transmission path for the current communication time slot is not yet adjusted, and because data cannot be transmitted from the source node 110 to the receiver node 120 during the current communication time slot. In other words, the system takes profit of this unused current communication time slot to perform a full scan of the 3D space in order to discover new transmission path to be used; the receiver node 120 transmits a predetermined radio signal with a directional antenna configuration 520b corresponding to the new transmission path and the source node 110 performs simultaneously a full scan of the 3D space in order to detect the predetermined radio signal sent by the receiver node 120 and then to align its antenna.

In fact the source node 110 determines a sender antenna orientation α enabling it to receive the predetermined radio signal coming from the receiver node 120 with the best signal power level measured at reception. The receiver antenna orientation β henceforth corresponds to the sender antenna orientation α to be used by the source node 110 for transmitting data in point-to-point mode to the receiver node 120 during the communication time slot. The parameters for the configuration of the sender antenna by the point-to-point transmission are then determined as a function of the parameters for the configuration of the receiver antenna used by the source node 110 when the receiver node 120 sends in a directional antenna configuration. To determine parameters for the configuration of the receiver antenna enabling point-to-point communication between the source node 110 and the receiver node 120, the source node 110 can for example measure the received radio signal by means of the sub-block 6010 in making the reception angle α vary by steps of 10 degrees in the zone of sensitivity of the antenna 500b (with a scan from −90 to +90 degrees). Then at step 15040 when a maximum signal is detected, a refined scanning of 1-degree steps around the maximum signal value (from −5 degrees to +5 degrees) provides the angle α that gives the best signal power level measured at reception. The source node 110 takes profit of this scanning to use from now the corresponding parameters for the new transmission path to be used in the communication time slot of the next TDM cycle, and then it updates accordingly its table "PathTable".

Next, at step 15050 a test is performed to detect the end of the current TDM cycle 320. If the test 15050 is positive, then a return to step 13020 is performed in order to process next TDM cycle, otherwise a return to step 15000 is performed in order to process next communication time slot.

At receiver node side, the receiver node 120 waits (step 15200) for a communication time slot allotted to the source node 110 in the time sequence 300 reserved for data transmission in point-to-point mode. Upon detection of a communication time slot (called hereafter "current communication time slot") allotted to the source node 110, the receiver node 120 verifies (step 15210) if there is a new point-to-point transmission path to use for the current communication time slot by reading the "PathTable".

If the test at step 15210 is negative, then the receiver node 120 receives the data sent by the source node 110 in point-to-point mode by using the corresponding antenna configuration parameters (i.e. angle set β). Then, the receiver node 120 performs step 15240.

If the test at step 15210 is positive, then the receiver node 120 transmits to the source node 110 a predetermined radio signal (step 15230) with a directional antenna configuration 520b corresponding to the new transmission path while simultaneously the source node 110 performs a full scan of the 3D space in order to detect the predetermined radio signal sent by the receiver node 120 and then to align its antenna.

Next, at step 15240 a test is performed to detect the end of the current TDM cycle 320. If the test 15240 is positive, then a return to step 13220 is performed in order to process next TDM cycle, otherwise a return to step 15200 is performed in order to process next communication time slot.

The invention claimed is:

1. A method of transmitting data signals from a first device to a second device during a cycle of a synchronous wireless communication channel implementing a time division multiplexing scheme, wherein the cycle comprises:
   a first and a second configuration time slots allotted respectively to the first and to the second devices for emitting reference signals and
   M (M>1) communication time slots, each of them allotted to the first device to emit data signals to the second device following one transmission path, associated with said communication time slot, among a set of K transmission paths between the first and the second devices, the method being performed by first device during said cycle and comprising the steps of:
   emitting a reference signal following, at least, the K transmission paths during the first configuration time slot;
   identifying valid transmission paths among the set of K transmission paths by listening, according to each transmission path of the set, for a feedback reference signal from the second device during the second configuration time slot; and
   emitting data signals in each communication time slot of which the associated transmission path has been identified as valid, wherein the second configuration time slot contains M sub-slots uniquely associated with the M communication slots, and wherein the step of identifying valid transmission paths comprising:
   during each sub-slot, listening for the feedback reference signal according to, successively, all the K transmission paths; and
   for each sub-slot during which the feedback reference signal has been detected, identifying the transmission path according to which the reference signal has been detected as valid and associating said transmission path to the communication time slot associated with said sub-slot.

2. The method according to claim 1, wherein the step of emitting a data signal in said each communication time slot is performed following the transmission path associated with said communication time slot during the associated sub-slot of the second configuration time slot.

3. The method according to claim 1, wherein the step of emitting a reference signal is performed in all possible directions by using a wide beam or omnidirectional sender antenna.

4. The method according to claim 3, wherein if during at least one sub-slot no feedback reference signal has been detected, the first device performs the following steps during the communication time slot associated with said sub-slot:
   switching from emission mode to reception mode; and
   searching for a valid transmission path by listening for a feedback reference signal from the second device according to all possible directions, wherein a valid transmission path is found when the feedback reference signal is detected;
   the first device then updating the set of K transmission paths with the found transmission path.

5. The method according to claim 4, wherein the searching step is performed by the first device by scanning in three dimensions using a narrow beam receiving antenna to detect the feedback reference signal.

6. A method of receiving data signals by a second device from a first device during a cycle of a synchronous wireless communication channel implementing a time division multiplexing scheme, wherein the cycle comprises:
a first and a second configuration time slots allotted respectively to the first and to the second devices for emitting reference signals and
M (M>1) communication time slots, each of them allotted to the first device to emit data signals to the second device following one transmission path, associated with said communication time slot, among a set of K transmission paths between the first and the second devices, the method being performed by second device during said cycle and comprising the steps of:
identifying valid transmission paths at least among the set of K transmission paths by listening, according to each transmission path of the set, for a reference signal from the first device during the first configuration time slot;
emitting, during the second configuration time slot, a feedback reference signal following each transmission path of a selection list containing all or part of the identified valid transmission paths; and receiving data signals from each communication time slot of which associated transmission path belongs to the selection list,
wherein the second configuration time slot contains M sub-slots uniquely associated with the M communication slots, and wherein the emitting of the reference feedback is performed in M sub-slots following respectively the M transmission paths of the selection list.

7. The method according to claim 6, wherein it comprises a step of building the selection list by:
if the number of identified valid transmission paths is greater than M, selecting M distinct valid transmission paths;
otherwise, selecting all the identified valid transmission paths and re-selecting as much as possible of distinct valid transmission paths so that to form a selection list of M transmission paths.

8. The method according to claim 7, wherein the step of identifying valid transmission paths consists of listening for the reference signal according to, successively, all the set of K transmission paths;
the reference signal being emitted by the first device in all possible directions by using a wide beam or omnidirectional sender antenna.

9. The method according to claim 8, wherein the step of identifying valid transmission paths further comprising the steps of:
searching for a valid transmission path by listening for a signal from the first device according to all possible directions, wherein a valid transmission path is found when a signal is detected; and
updating the set of K transmission paths with the found transmission path.

10. The method according to claim 9, wherein if the set of transmission paths is updated with a newly found transmission path and if said new path has been included in the selection list during the building step, the second device performs the following steps during the communication time slot associated with said new path:
switching from reception mode to emission mode; and
emitting a feedback reference signal following the new transmission path.

11. The method according to claim 9, wherein the steps of searching and updating are executed during at least one of the following:
the first configuration time slot of any cycle after the listening for the reference signal according to all the set of K transmission paths is finished;
any time slot allotted for the first device to emit a signal when the set of K transmission paths is empty.

12. A first device for transmitting data signals to a second device during a cycle of a synchronous wireless communication channel implementing a time division multiplexing (TDM) scheme, wherein the cycle comprises:
a first and a second configuration time slots allotted respectively to the first and to the second devices for emitting reference signals and
M (M>1) communication time slots, each of them allotted to the first device to emit data signals to the second device following one transmission path, associated with said communication time slot, among a set of K transmission paths between the first and the second devices, the first device comprising:
a unit configured to emit a reference signal following, at least, the K transmission paths during the first configuration time slot;
a unit configured to identify valid transmission paths among the set of K transmission paths by listening, according to each transmission path of the set, for a feedback reference signal from the second device during the second configuration time slot; and
a unit configured to emit data signals in each communication time slot of which the associated transmission path has been identified as valid, wherein the second configuration time slot contains M sub-slots uniquely associated with the M communication slots, and wherein the unit adapted to identify valid transmission paths is, during each sub-slot, responsive to the feedback reference signal according to, successively, all the K transmission paths, and
for each sub-slot during which a feedback reference signal has been detected, said unit is adapted to identify the transmission path according to which the reference signal has been detected as valid and associate said transmission path to the communication time slot associated with said sub-slot.

13. A second device for receiving data signals from a first device during a cycle of a synchronous wireless communication channel implementing a time division multiplexing (TDM) scheme, wherein the cycle comprises:
a first and a second configuration time slots allotted respectively to the first and to the second devices for emitting reference signals and
M (M>1) communication time slots, each of them allotted to the first device to emit data signals to the second device following one transmission path, associated with said communication time slot, among a set of K transmission paths between the first and the second devices, the second device comprising:
a unit configured to identify valid transmission paths at least among the set of K transmission paths by listening, according to each transmission path of the set, for a reference signal from the first device during the first configuration time slot;
an emitter unit configured to emit, during the second configuration time slot, a feedback reference signal following each transmission path of a selection list containing all or part of the identified valid transmission paths; and
a receiver unit configured to receive data signals from each communication time slot of which associated transmission path belongs to the selection list,
wherein the second configuration time slot contains M sub-slots uniquely associated with the M communication slots, and wherein the emitter unit is adapted to emit said reference feedback signal in M sub-slots following respectively the M transmission paths of the selection list.

14. A non-transitory computer-readable carrier medium storing a program which, when executed by a computer or a processor in a device for transmitting or receiving data, causes the device to carry out the method of transmitting according to claim 1.

* * * * *